United States Patent
Endo

(10) Patent No.: US 9,769,727 B2
(45) Date of Patent: Sep. 19, 2017

(54) WIRELESS COMMUNICATION TERMINAL, WIRELESS COMMUNICATION SYSTEM, WIRELESS COMMUNICATION METHOD, AND PROGRAM

(71) Applicant: OLYMPUS CORPORATION, Tokyo (JP)

(72) Inventor: Takahisa Endo, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 100 days.

(21) Appl. No.: 14/547,254

(22) Filed: Nov. 19, 2014

(65) Prior Publication Data

US 2015/0071107 A1 Mar. 12, 2015

Related U.S. Application Data

(63) Continuation of application No. PCT/JP2013/062017, filed on Apr. 24, 2013.

(30) Foreign Application Priority Data

Jun. 21, 2012 (JP) ................................ 2012-139574

(51) Int. Cl.
*H04L 1/00* (2006.01)
*H04W 40/12* (2009.01)
(Continued)

(52) U.S. Cl.
CPC .............. *H04W 40/12* (2013.01); *H04B 7/06* (2013.01); *H04B 7/08* (2013.01); *H04W 24/08* (2013.01)

(58) Field of Classification Search
CPC .................................................. H04W 24/10
(Continued)

(56) References Cited

U.S. PATENT DOCUMENTS

2005/0141595 A1* 6/2005 Inoue ................... H04B 1/7183
375/130
2008/0204319 A1 8/2008 Niu et al.
(Continued)

FOREIGN PATENT DOCUMENTS

JP     2008-54336 A     3/2008
JP     2010-161513 A     7/2010
(Continued)

OTHER PUBLICATIONS

International Search Report dated Jul. 9, 2013, issued in corresponding application No. PCT/JP2013/062017.
(Continued)

*Primary Examiner* — Shripal Khajuria
(74) *Attorney, Agent, or Firm* — Westerman, Hattori, Daniels & Adrian, LLP

(57) ABSTRACT

A wireless communication terminal includes: an antenna unit, a processing unit configured to process the video data transmitted or received through the directional antenna, and a control unit. The control unit sets the communication path as a first communication path, and causes the antenna unit to transmit or receive the video data of the one frame or the one field through the first communication path, and the control unit sets the communication path as a second communication path different from the first communication path in the same frame period or the same field period as a frame period or a field period in which the video data is transmitted or received through the first communication path, and causes the antenna unit to transmit or receive same video data as all or some of the video data transmitted or received through the first communication path, through the second communication path.

14 Claims, 22 Drawing Sheets

(51) Int. Cl.
  *H04B 7/06* (2006.01)
  *H04B 7/08* (2006.01)
  *H04W 24/08* (2009.01)

(58) Field of Classification Search
  USPC .......................................................... 370/352
  See application file for complete search history.

(56) References Cited

U.S. PATENT DOCUMENTS

| | | |
|---|---|---|
| 2008/0240031 A1 | 10/2008 | Nassiri-Toussi et al. |
| 2009/0061795 A1 | 3/2009 | Doan et al. |
| 2011/0045785 A1 | 2/2011 | Sutskover et al. |
| 2011/0317595 A1* | 12/2011 | Kanda .................. H04W 16/28 370/277 |
| 2011/0317772 A1 | 12/2011 | Inohiza et al. |
| 2012/0002681 A1 | 1/2012 | Inohiza et al. |

FOREIGN PATENT DOCUMENTS

| | | |
|---|---|---|
| JP | 2011-82876 A | 4/2011 |
| WO | 2010/050599 A1 | 5/2010 |

OTHER PUBLICATIONS

Extended European Search Report dated Jan. 8, 2016, issued in counterpart European Patent Application No. 13807228.5. (10 pages).

* cited by examiner

FIG. 12

| Direction | HORIZONTAL [°] | VERTICAL [°] |
|---|---|---|
| 1 | 0 | 0 |
| 2 | 0 | 45 |
| 3 | 0 | -45 |
| 4 | 45 | 0 |
| 5 | 45 | 45 |
| 6 | 45 | -45 |
| 7 | -45 | 0 |
| 8 | -45 | 45 |
| 9 | -45 | -45 |

FIG. 13

| Slot | Path_No | Tx Direction | Rx Direction |
|---|---|---|---|
| 1 | 1 | 1 | 1 |
| 2 | 4 | 1 | 4 |
| N-1 | 80 | 9 | 8 |
| N | 11 | 2 | 2 |

FIG. 14

| Path_No | Tx Direction | Rx Direction | RSSI [dBm] | Transmit Error |
|---|---|---|---|---|
| 1 | 1 | 1 | -20 | 0 |
| 2 | 1 | 2 | -35 | 0 |
| 3 | 1 | 3 | -30 | 1 |
| 4 | 1 | 4 | -25 | 0 |
| 5 | 1 | 5 | -35 | 0 |
| 6 | 1 | 6 | -45 | 0 |
| 7 | 1 | 7 | -25 | 0 |
| 8 | 1 | 8 | -35 | 0 |
| 9 | 1 | 9 | -50 | 1 |
| 10 | 2 | 1 | -60 | 1 |
| 11 | 2 | 2 | -30 | 0 |
| 12 | 2 | 3 | -40 | 0 |
| 79 | 9 | 7 | -40 | 0 |
| 80 | 9 | 8 | -25 | 0 |
| 81 | 9 | 9 | -50 | 0 |

WIRELESS COMMUNICATION TERMINAL, WIRELESS COMMUNICATION SYSTEM, WIRELESS COMMUNICATION METHOD, AND PROGRAM

This application is a continuation application based on a PCT International Application No. PCT/JP2013/062017, filed on Apr. 24, 2013, whose priority is claimed on Japanese Patent Application No. 2012-139574, filed Jun. 21, 2012. The contents of the PCT Application, and the Japanese Patent Application are incorporated herein by reference.

BACKGROUND OF THE INVENTION

Field of the Invention

The present invention relates to a technique of transmitting or receiving video data through wireless communication using a directional antenna.

Description of Related Art

In the related art, when a video receiving terminal selects and displays videos transmitted from a plurality of video transmitting terminals, a video signal switching device (a switcher) is arranged between the video receiving terminal and the video transmitting terminals, the video receiving terminal is connected with the video signal switching device using a cable, the video signal switching device is connected with the video transmitting terminals using a cable, and the video signal switching device is controlled such that selection of a video is performed. When the number of video receiving terminals to be used and the number of video transmitting terminals to be used are increased, there is a problem in that cable wiring and a configuration of the video signal switching device become complicated, and it is hard to promptly cope with a change in the layouts of the video receiving terminal and the video transmitting terminal.

In recent years, as a wireless transmission technique has been improved, it has become possible to wirelessly transmit high-definition video from a video transmitting terminal to a video receiving terminal, and a method of selecting a video to be displayed on the video receiving terminal by switching a wireless connection between the video receiving terminal and the video transmitting terminal has been considered.

As a wireless transmission technique of video data, a millimeter wave radio technique using a 60 GHz band capable of using a broad bandwidth and performing high-speed wireless transmission has attracted attention (for example, see Japanese Unexamined Patent Application, First Publication No. 2011-82876). In a wireless HD standard that is a standard of a millimeter wave radio technique, a high rate PHY (HRP) that is a high-speed transmission channel and a low rate PHY (LRP) that is a low-speed transmission channel are specified.

The HRP is limited in a range of a communication path since a narrow-directional antenna is used, but since a high gain is obtained, the HRP is used for high-rate video data transmission such as transmission of video data. However, the LRP is less limited in a range of a communication path than the HRP since a wide-directional antenna is used at a low rate, and since communication is hardly interrupted, the LRP is used for transmission of control data or the like.

A wireless millimeter wave has a property of being close to light and has a feature of traveling in a straight line, and thus when a shielding object such as a human crosses a communication path, communication is easily interrupted. In order to avoid this problem, for example, when an obstacle moves onto a communication path during transmission of video data and thus a wireless environment gets worse, control for maintaining a communication rate is performed by changing directivity of an antenna using an active array antenna or the like and setting a communication path having a good wireless environment.

For example, as illustrated in FIG. 22, when a communication failure occurs in a communication path P1 while a video transmitting terminal TX is transmitting video data to a video receiving terminal RX using the communication path P1, directivity of an antenna is changed, so that a communication path is changed from the communication path P1 to a communication path P2. However, when a wireless environment changes in a bursting manner due to influence of door opening and closing or the like, it takes time to set an optimal communication path, and a video may be interrupted as illustrated in FIG. 23. FIG. 23 illustrates an example in which video data is transmitted from a video transmitting terminal to a video receiving terminal. Time flows to the right in FIG. 23.

In the example of FIG. 23, a communication path is changed to a communication path P2 after video data of a first frame is transmitted through a communication path P1, but it takes time to change a communication path. There are cases in which video data of a frame to be transmitted is not transmitted in the process of changing a communication path, and thus a video is interrupted.

SUMMARY OF INVENTION

According to a first aspect of the present invention, a wireless communication terminal includes an antenna unit having a directional antenna configured to transmit or receive video data of one frame or one field in a one-frame period or a one-field period through a set communication path, a processing unit configured to process the video data transmitted or received through the directional antenna, and a control unit. The control unit sets the communication path as a first communication path, and causes the antenna unit to transmit or receive the video data of the one frame or the one field through the first communication path, and the control unit sets the communication path as a second communication path different from the first communication path in the same frame period or the same field period as a frame period or a field period in which the video data is transmitted or received through the first communication path, and causes the antenna unit to transmit or receive same video data as all or some of the video data transmitted or received through the first communication path, through the second communication path.

According to a second aspect of the present invention, in the wireless communication terminal according to the first aspect, the control unit may further cause the antenna unit to transmit or receive information related to the first communication path and information related to the second communication path to or from another communication terminal serving as a video data transmission or reception counterpart.

According to a third aspect of the present invention, in the wireless communication terminal according to the first aspect, the control unit may further measure wireless states of a plurality of communication paths through the antenna unit at a point in time earlier than a point in time at which video data of a first frame or a first field is transmitted or received when video data of a plurality of frames or a plurality of fields is transmitted or received.

According to a fourth aspect of the present invention, in the wireless communication terminal according to the first aspect, the control unit may further measure wireless states of a plurality of communication paths through the antenna unit in the same frame period of the same field period as a frame period or a field period in which the video data is transmitted or received through the first communication path and the second communication path when video data of a plurality of frames or a plurality of fields is transmitted or received.

According to a fifth aspect of the present invention, in the wireless communication terminal according to the fourth aspect, a plurality of communication paths whose wireless states are measured in a first frame period or a first field period may be different from a plurality of communication paths whose wireless states are measured in a second frame period or a second field period directly after the first frame period or the first field period.

According to a sixth aspect of the present invention, the wireless communication terminal according to the third aspect may further include a storage unit configured to store measurement result information representing a result of measuring the wireless states of the plurality of communication paths.

According to a seventh aspect of the present invention, in the wireless communication terminal according to the sixth aspect, the control unit may select and set the first communication path and the second communication path based on the measurement result information.

According to an eighth aspect of the present invention, in the wireless communication terminal according to the seventh aspect, the control unit may lower a priority of a communication path in which an amount of communication errors incurred when the video data is transmitted or received within the one-frame period or the one-field period exceeds a predetermined threshold value, the priority being set in a next one-frame period or a next one-field period.

According to a ninth aspect of the present invention, the wireless communication terminal according to the fourth aspect further may include a storage unit configured to store measurement result information representing a result of measuring the wireless states of the plurality of communication paths.

According to a tenth aspect of the present invention, in the wireless communication terminal according to the ninth aspect, the control unit may select and set the first communication path and the second communication path based on the measurement result information.

According to an eleventh aspect of the present invention, in the wireless communication terminal according to the tenth aspect, the control unit lowers a priority of a communication path in which an amount of communication errors incurred when the video data is transmitted or received within the one-frame period or the one-field period exceeds a predetermined threshold value, the priority being set in a next one-frame period or a next one-field period.

According to a twelfth aspect of the present invention, in the wireless communication terminal according to the first aspect, the control unit complements data that is insufficient in the video data received through the first communication path and the video data received through the second communication path, and generates the video data of the one frame or the one field.

According to a thirteenth aspect of the present invention, a wireless communication system includes a first wireless communication terminal and a second wireless communication terminal, wherein the first wireless communication terminal includes a first antenna unit having a first directional antenna configured to transmit video data of one frame or one field in a one-frame period or a one-field period through a set communication path, a processing unit configured to process the video data transmitted through the first directional antenna, and a first control unit, wherein the first control unit sets the communication path as a first communication path, and causes the first antenna unit to transmit the video data of the one frame or the one field through the first communication path, and the first control unit sets the communication path as a second communication path different from the first communication path in the same frame period or the same field period as a frame period or a field period in which the video data is transmitted through the first communication path, and causes the first antenna unit to transmit same video data as all or some of the video data transmitted through the first communication path through the second communication path, and the second wireless communication terminal includes a second antenna unit having a second directional antenna configured to receive video data of the one frame or the one field in the one-frame period or the one-field period through a set communication path, a second processing unit configured to process the video data received through the second directional antenna, and a second control unit, wherein the second control unit sets the communication path as the first communication path, and causes the second antenna unit to receive the video data of the one frame or the one field through the first communication path, and the second control unit sets the communication path as the second communication path in the same frame period or the same field period as a frame period or field period in which the video data is received through the first communication path, and causes the second antenna unit to receive same video data as all or some of the video data received through the first communication path through the second communication path.

According to a fourteenth aspect of the present invention, a wireless communication method of performing wireless communication through a wireless communication terminal including an antenna unit having a directional antenna configured to transmit or receive video data of one frame or one field in a one-frame period or a one-field period through a set communication path and a processing unit configured to process the video data transmitted or received through the directional antenna. The wireless communication method includes a first step of setting the communication path as a first communication path, a second step of causing the antenna unit to transmit or receive the video data of the one frame or the one field through the first communication path, a third step of setting the communication path as a second communication path different from the first communication path in the same frame period or the same field period as a frame period or a field period in which the video data is transmitted or received through the first communication path, and a fourth step of causing the antenna unit to transmit or receive same video data as all or some of the video data transmitted or received through the first communication path through the second communication path.

According to a fifteenth aspect of the present invention, a computer program product storing a program that causes a computer of a wireless communication terminal, which includes a wireless communication terminal including an antenna unit including a directional antenna configured to transmit or receive video data of one frame or one field in a one-frame period or a one-field period through a set communication path and a processing unit configured to process the video data transmitted or received through the directional antenna, to execute: a first step of setting the communication path as a first communication path, a second step of causing the antenna unit to transmit or receive the video data of the one frame or the one field through the first communication path, a third step of setting the communication path as a second communication path different from the first communication path in the same frame period or the same field period as a frame period or a field period in which the video data is transmitted or received through the first communication path, and a fourth step of causing the antenna unit to transmit or receive same video data as all or some of the video data transmitted or received through the first communication path through the second communication path.

BRIEF DESCRIPTION OF THE DRAWINGS

FIG. 12 is a reference diagram illustrating content of a directivity pattern table according to the first embodiment of the present invention.

FIG. 13 is a reference diagram illustrating content of a communication path table according to the first embodiment of the present invention.

FIG. 14 is a reference diagram illustrating content of a communication state table according to the first embodiment of the present invention.

DETAILED DESCRIPTION OF THE INVENTION

Hereinafter, exemplary embodiments of the present invention will be described with reference to the appended drawings.

First Embodiment

Figure 1:
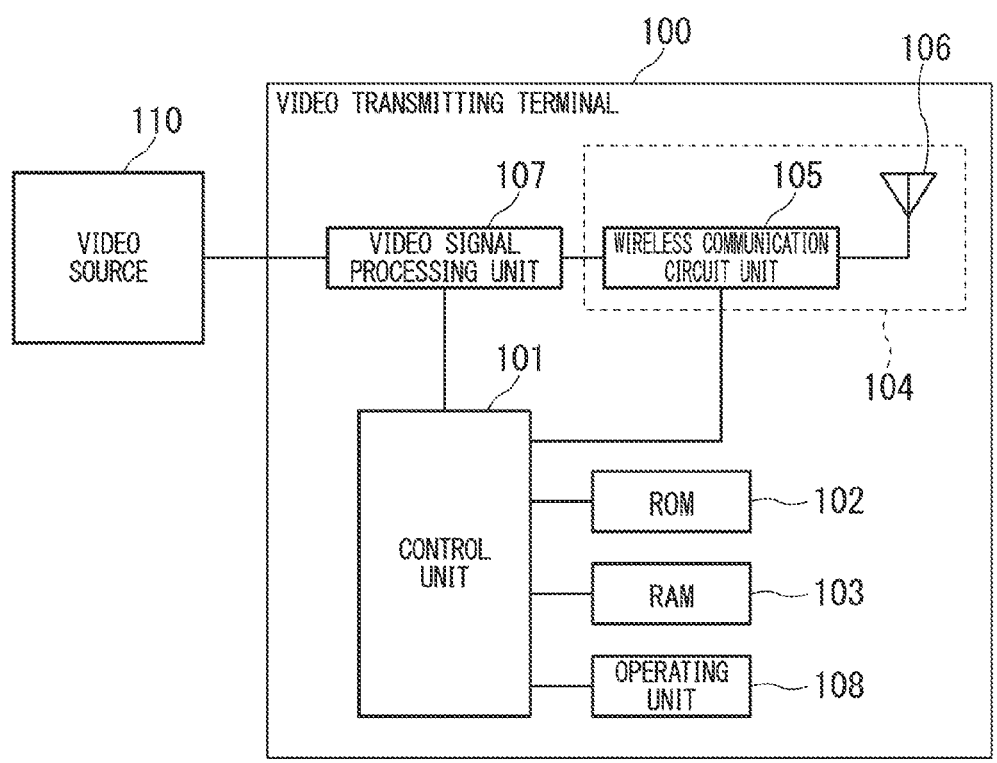
FIG. 1 is a block diagram illustrating a configuration of a video transmitting terminal according to a first embodiment of the present invention.

First, a first embodiment of the present invention will be described. FIG. 1 illustrates an electric configuration of a video transmitting terminal with a video transmission function among wireless communication terminals according to the present embodiment. A video transmitting terminal 100 illustrated in FIG. 1 includes a control unit 101, a read only memory (ROM) 102, a random access memory (RAM) 103, an antenna unit 104, a video signal processing unit 107, and an operating unit 108, which are connected with one another as illustrated in FIG. 1. A video source 110 is connected to the video transmitting terminal 100.

The control unit 101 operates according to a program stored in the ROM 102, and controls an operation sequence of the video transmitting terminal 100. The ROM 102 is a non-volatile memory such as a flash ROM, and various kinds of setting information including program data and communication setting parameters used to control the video transmitting terminal 100 are stored in the ROM 102.

The RAM 103 is used as a work area for a calculation of the control unit 101 and the like and an area temporarily storing various kinds of settings and the like. The antenna unit 104 transmits video data through wireless communication. For example, the antenna unit 104 includes a wireless communication circuit unit 105 and an antenna 106. The wireless communication circuit unit 105 includes a high frequency circuit unit, an encoding/decoding circuit unit, a buffer memory, and the like which are necessary for wireless communication, and is connected with the antenna 106. In the present embodiment, a wireless scheme using millimeter waves is used as an exemplary wireless communication technique. The antenna 106 is a directional antenna capable of controlling directivity.

The antenna 106 is configured with an adaptive array antenna, and operates in an operation mode of either of a directive mode and a non-directive mode. The control unit 101 can control a setting of a phase of a wireless signal transmitted or received through an antenna element configuring the antenna 106 such that switching between the directive mode and the non-directive mode is performed. In the directive mode, according to a setting performed by the control unit 101, directional angles of the antenna 106 in a horizontal plane and a vertical plane are controlled, and beams corresponding to a predetermined directional angle are formed.

In the directive mode, a pattern of the directional angle of the antenna 106 is set according to a directivity pattern table. FIG. 12 illustrates an exemplary directivity pattern table. The directivity pattern table includes values of items such as "Direction," "Horizontal [°]," and "Vertical [°]." "Direction" is a number identifying a pattern of a directional angle. "Horizontal [°]" is a setting value of the directional angle in the horizontal plane, and "Vertical [°]" is a setting value of the directional angle in the vertical plane. In the example illustrated in FIG. 12, the directional angles in the horizontal plane and the vertical plane are controlled at the resolution of 45° in a range of −45° to +45°, and beams according to 9 types of patterns indicated by Direction 1 to Direction 9 can be formed. As a result, a high gain can be obtained at the time of transmission and reception, but a range of a usable directional angle is limited. The directivity pattern table illustrated in FIG. 12 is stored in the ROM 102.

In the present embodiment, the directional angle of the antenna 106 is set as illustrated in FIG. 12, but the range of the directional angle of the antenna 106 and the resolution of the directional angle of the antenna 106 are not limited to this example. In the non-directive mode, compared to the directive mode, a gain at the time of transmission and reception is low, but a wide directional angle of about 180° can be set.

The video signal processing unit 107 performs a compression process on video data provided from the video source 110 according to a predetermined scheme, and then stores the compressed video data in a buffer in the RAM 103. At a point in time at which the compression process of video data of one frame is completed, the video signal processing unit 107 generates a data ready interrupt for notifying the control unit 101 of the fact that the video data has been prepared.

The operating unit 108 includes a plurality of switches such as a power switch, an operation switch, and a setting switch, and outputs electric signals representing states and state changes of the switches to the control unit 101. In the operating unit 108, a plurality of light-emitting diodes (LEDs) for indicating a connection state and a communication state with the video receiving terminal are arranged.

The video source 110 is a device that supplies video data of a video camera, a DVD player, or the like, and connected to the video signal processing unit 107 via a video interface such as HDMI (a registered trademark) or DVI. In FIG. 1, the video source 110 is arranged in a housing different from a housing in which the control unit 101 or the like is arranged, and connected to the video signal processing unit 107. However, the video source 110 may be arranged in a housing in which the control unit 101 or the like is arranged and connected to the video signal processing unit 107.

Among the components of the video transmitting terminal 100 illustrated in FIG. 1, the ROM 102, the RAM 103, and the operating unit 108 are not essential components in the wireless communication terminal of the present invention. The wireless communication terminal of the present invention may be configured with the control unit 101, the antenna unit 104, and the video signal processing unit 107.

Figure 2:
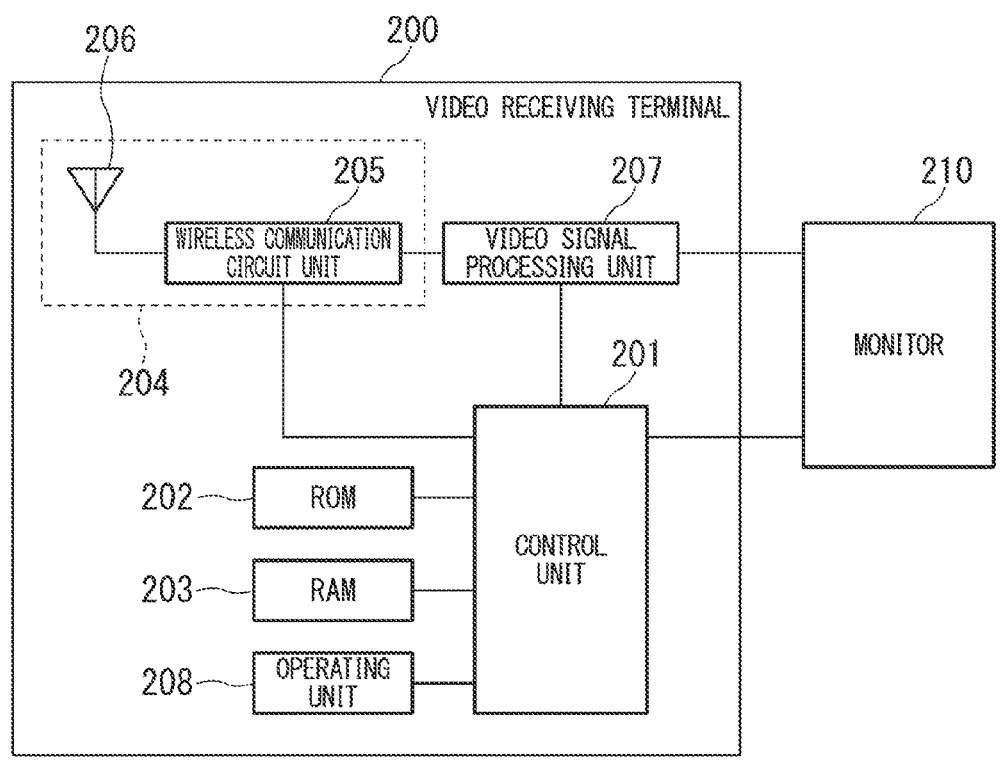
FIG. 2 is a block diagram illustrating a configuration of a video receiving terminal according to the first embodiment of the present invention.

FIG. 2 illustrates an electric configuration of the video receiving terminal having a video reception function among the wireless communication terminals according to the present embodiment. The video receiving terminal 200 illustrated in FIG. 2 includes a control unit 201, a ROM 202, a RAM 203, an antenna unit 204, a video signal processing unit 207, and an operating unit 208 which are connected to each other as illustrated in FIG. 2. A monitor 210 is connected to the video receiving terminal 200.

The control unit 201 operates according to a program stored in the ROM 202, and controls an operation sequence of the video receiving terminal 200. The ROM 202 is a non-volatile memory such as a flash ROM, and various kinds of setting information including program data and a communication setting parameter used to control the video receiving terminal 200 are stored in the ROM 202.

The RAM 203 is used as a work area, for example, for a calculation of the control unit 201 and used as an area for temporarily storing various kinds of settings and the like. The antenna unit 204 receives video data through wireless communication. For example, the antenna unit 204 includes a wireless communication circuit unit 205 and an antenna 206. The wireless communication circuit unit 205 includes a high frequency circuit unit, an encoding/decoding circuit unit, a buffer memory, and the like which are necessary for wireless communication, and the antenna 206 is connected thereto. In the present embodiment, for example, a wireless scheme using millimeter waves is used as an example of a wireless communication scheme. The antenna 206 is a directional antenna having the same function as the antenna 106. According to a setting performed by the control unit 201, it is possible to perform switching between the directive mode and the non-directive mode and change the directional angle of the antenna 206 in the directive mode.

Using a communication path according to the pattern of the directional angle set to the antenna 106 of the video transmitting terminal 100 and the pattern of the directional angle set to the antenna 206 of the video receiving terminal 200, wireless communication of video data is performed between the video transmitting terminal 100 and the video receiving terminal 200. In other words, the control unit 101 of the video transmitting terminal 100 sets a pattern of the directional angle of the antenna 106, for example, one of the 9 types of patterns illustrated in FIG. 12. Further, as the control unit 201 of the video receiving terminal 200 sets the pattern of the directional angle of the antenna 206, for example, one of the 9 types of patterns illustrated in FIG. 12, a communication path is set between the video transmitting terminal 100 and the video receiving terminal 200.

The video signal processing unit 207 decompresses the compressed video data received through the wireless communication circuit unit 205, then converts the decompressed video data to a video signal according to DMI (a registered trademark), NTSC, or the like, and outputs the video signal to the monitor 210. The operating unit 208 includes a plurality of switches such as a power switch, an operation switch, and a setting switch, and outputs electric signals representing states and state changes of the switches to the control unit 201. When a video transmitting terminal serving as a connection counterpart of the video receiving terminal 200 is switched, the operating unit 208 operates as an input unit through which an operator selects the video transmitting terminal of the connection counterpart from a list of video transmitting terminals displayed on the monitor 210 and then inputs an instruction.

The monitor 210 includes a liquid crystal display (LCD) device and a control circuit thereof, and operates as a display unit that displays a video based on video data received from the video transmitting terminal 100 and informs of a wireless connection state. Further, when the video transmitting terminal serving as the connection counterpart of the video receiving terminal 200 is switched, the monitor 210 operates a display unit that displays a list of selectable video transmitting terminals.

Figure 3:
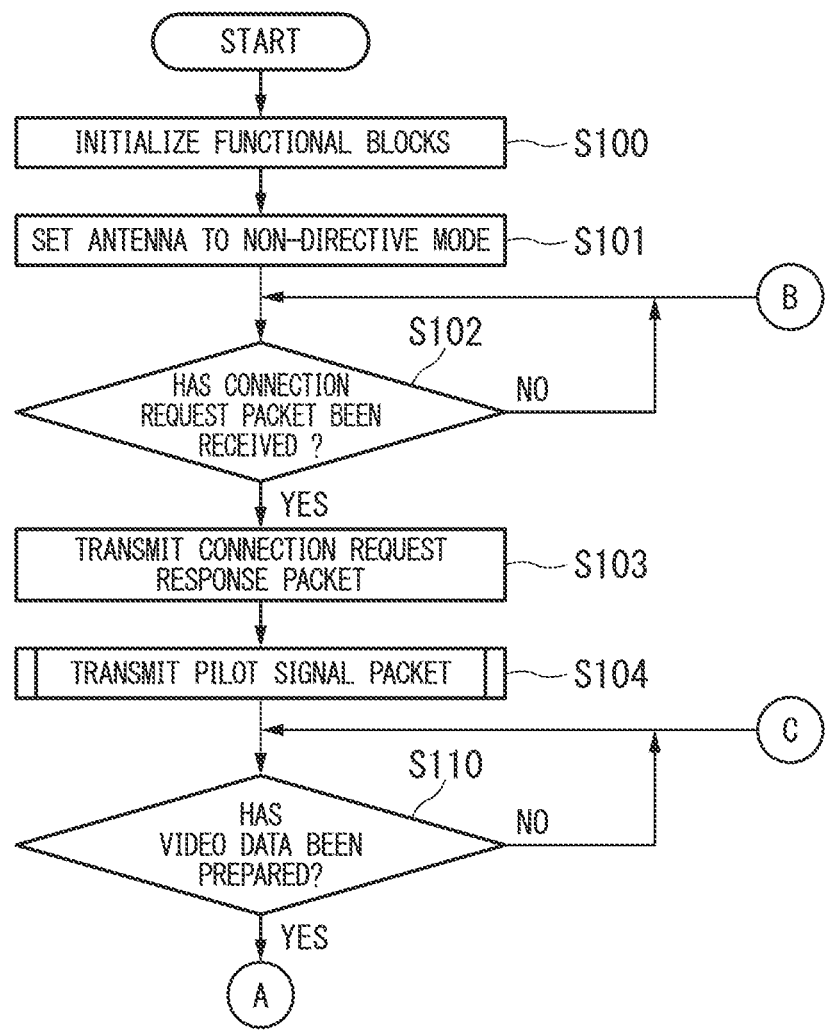
FIG. 3 is a flowchart illustrating an operation process of the video transmitting terminal according to the first embodiment of the present invention.
Figure 4:
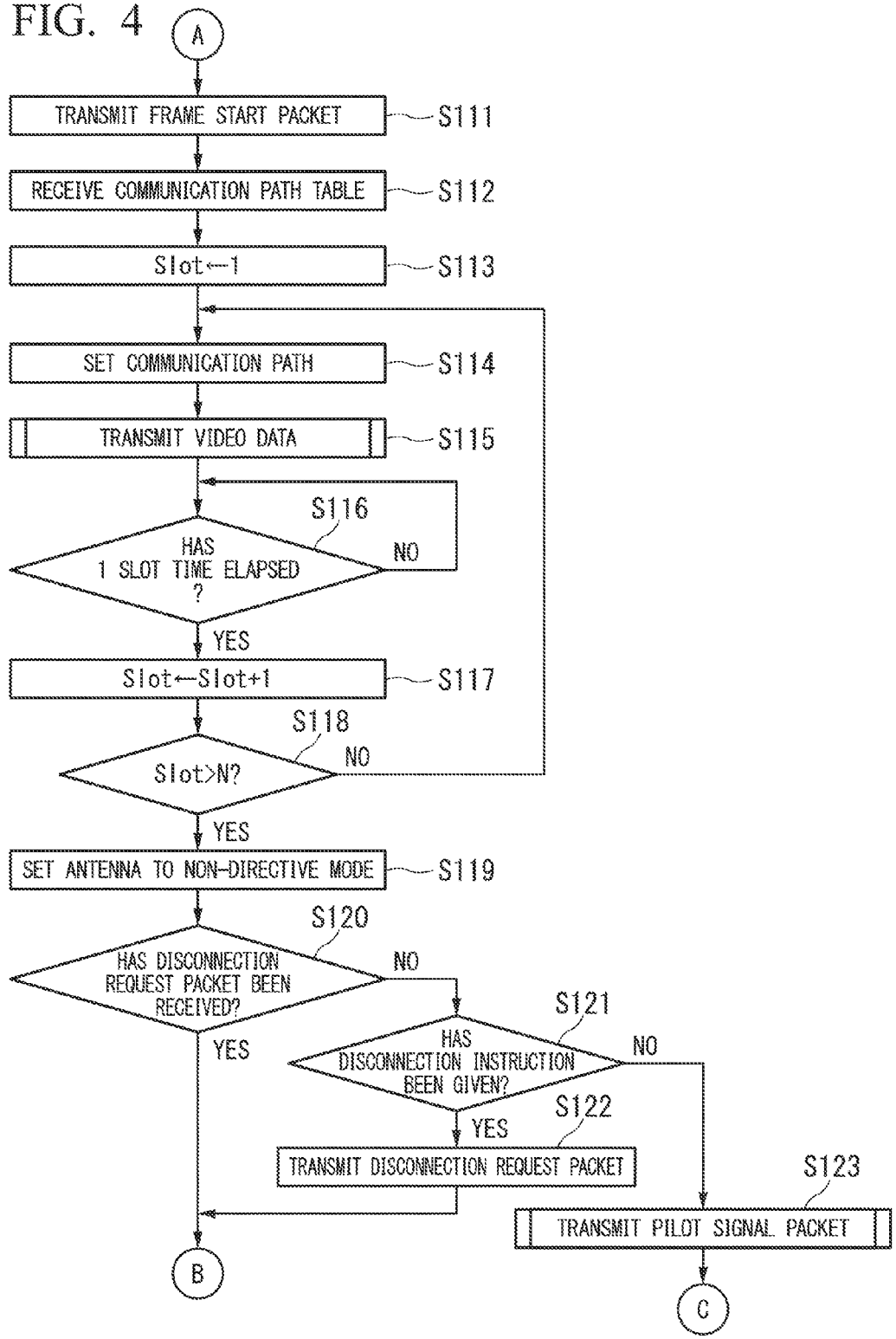
FIG. 4 is a flowchart illustrating an operation process of the video transmitting terminal according to the first embodiment of the present invention.

Next, an operation of the video transmitting terminal 100 will be described. FIGS. 3 and 4 illustrate an operation of the video transmitting terminal 100. When the video transmitting terminal 100 is powered on, the control unit 101 initializes the functional blocks of the video transmitting terminal 100 (step S100), and then sets the operation mode of the antenna 106 to the non-directive mode (step S101).

Then, the control unit 101 enters a standby state for receiving a connection request packet transmitted from the video receiving terminal 200 (step S102). The connection request packet is a packet transmitted to request a connection with the connection counterpart of the wireless communication. Upon receiving the connection request packet through the antenna unit 104, the control unit 101 controls the antenna unit 104 such that a connection request response packet serving as a response to the connection request packet is transmitted to the video receiving terminal 200 (step S103). As a result, a connection with the video receiving terminal 200 is established. In the present embodiment, in response to the connection request received from the video receiving terminal 200, the video transmitting terminal 100 transmits the connection request response to the video receiving terminal 200. As a result, a connection between the video transmitting terminal 100 and the video receiving terminal 200 is established. However, the video receiving terminal 200 may transmit the connection request response to the video transmitting terminal 100 in response to the connection request received from the video transmitting terminal 100, and thus the connection between the video transmitting terminal 100 and the video receiving terminal 200 may be established.

Then, the control unit 101 controls the antenna unit 104 such that a pilot signal packet for searching for a communication path that the video receiving terminal 200 uses for wireless communication with the video transmitting terminal 100 is transmitted (step S104). As will be described later, the video receiving terminal 200 searches for a communication path based on a result of measuring communication quality when the pilot signal packet is received from the video transmitting terminal 100 before video data of a first frame is transmitted from the video transmitting terminal 100.

Figure 5:
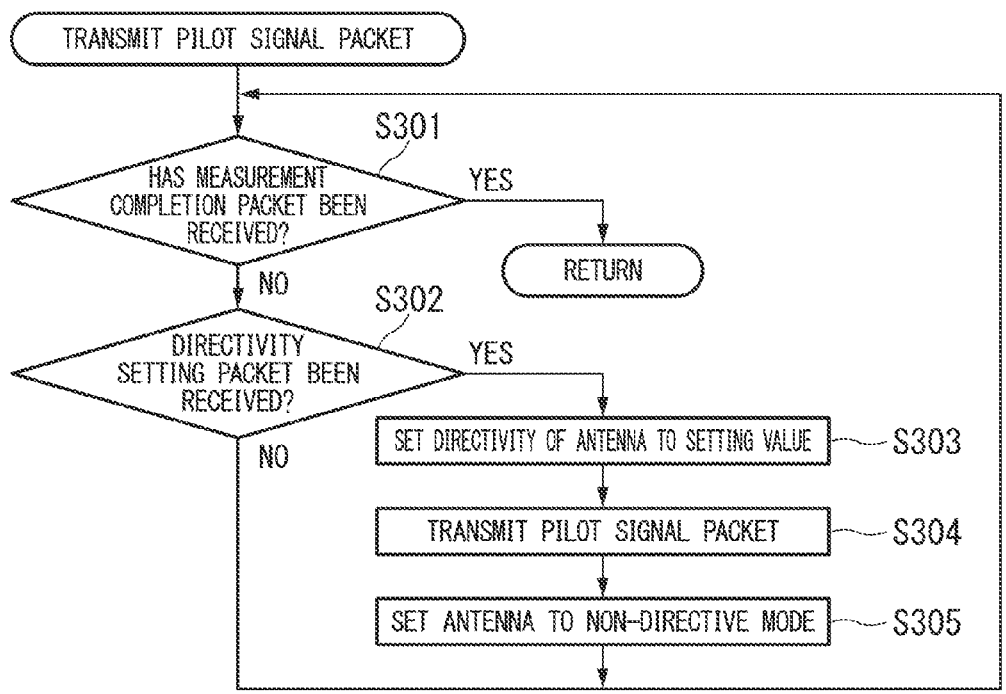
FIG. 5 is a flowchart illustrating an operation process of the video transmitting terminal according to the first embodiment of the present invention.

FIG. 5 illustrates a detailed operation of the video transmitting terminal 100 when the pilot signal packet is transmitted in step S104. The control unit 101 determines whether or not a measurement completion packet indicating that measurement of the communication quality of each communication path has been completed by the video receiving terminal 200 has been received from the video receiving terminal 200 (step S301).

When the measurement completion packet has not been received, the control unit 101 determines whether or not a directivity setting packet has been received from the video receiving terminal 200 (step S302). The directivity setting packet is a packet including the setting values of the directional angles in the horizontal direction and the vertical direction which are set to the antenna 106. When the directivity setting packet has not been received, the control unit 101 performs the determination of step S301 again. However, when the directivity setting packet has been received, the control unit 101 sets the directional angle of the antenna 106 to the directional angle represented by the setting value included in the directivity setting packet (step S303). As a result, the antenna 106 operates in the directive mode.

Then, the control unit 101 controls the antenna unit 104 such that the pilot signal packet is transmitted (step S304). After transmitting the pilot signal packet, the control unit 101 sets the operation mode of the antenna 106 to the non-directive mode (step S305). Then, the control unit 101 performs the determination of step S301 again. When the measurement completion packet has been received, the transmission of the pilot signal packet ends.

After the transmission of the pilot signal packet ends, the control unit 101 determines the presence or absence of the video data ready interrupt transmitted by the video signal processing unit 107, and determines whether or not video data has been prepared (step S110). When the video data has not been prepared, the control unit 101 repeats the determination of step S110 until the video data is prepared. When the video data has been prepared, the control unit 101 controls the antenna unit 104 such that a frame start packet for synchronizing transmission and reception of video data is transmitted to the video receiving terminal 200 (step S111). The frame start packet is a packet for notifying of a frame start timing. Then, the control unit 101 controls the antenna unit 104 such that a communication path table is received from the video receiving terminal 200 (step S112).

The communication path table is a table including communication path information set for each slot configuring one frame. FIG. 13 illustrates exemplary content of the communication path table. The communication path table includes values of items such as "Slot," "Path_No," "Tx Direction," and "Rx Direction." "Slot" is a number of a slot configuring one frame. "Path_No" is a number identifying a communication path. "Tx Direction" is a number identifying a pattern of a directional angle to be set to the antenna 106 of the video transmitting terminal 100. "Rx Direction" is a number identifying a pattern of a directional angle to be set to the antenna 206 of the video receiving terminal 200. The numbers of "Tx Direction" and "Rx Direction" correspond to the number of "Direction" in the pattern of the directional angle illustrated in FIG. 12.

For example, in a first slot (slot=1) in a one-frame period, the pattern of the directional angle of Direction 1 illustrated in FIG. 12 is set to both the video transmitting terminal 100 and the video receiving terminal 200. Then, in a second slot (slot=2) in the same one-frame period, the pattern of the directional angle of Direction 1 illustrated in FIG. 12 is set to the video transmitting terminal 100, and the pattern of the directional angle of Direction 4 illustrated in FIG. 12 is set to the video receiving terminal 200. In subsequent slots, similarly, the pattern of the directional angle represented by the communication path table is set to the video transmitting terminal 100 and the video receiving terminal 200.

After the communication path table is received, the control unit 101 sets a value of a variable Slot representing the slot number to 1 (step S113). As a result, processing of the first slot starts. Then, the control unit 101 reads a number of a pattern of a directional angle corresponding to a slot number represented by the value of the variable Slot, reads the setting value of the directional angle corresponding to the read number from the directivity pattern table, and sets the directional angle of the antenna 106 to the directional angle represented by the read setting value (step S114). As a result, a communication path is set. For example, when the value of the variable Slot is 1, 1 is read from the communication path table illustrated in FIG. 13 as the value of "Tx Direction," and 0 that is the value of the directional angle in the horizontal direction and the directional angle in the vertical direction corresponding to the value is read from the directivity pattern table illustrated in FIG. 12.

Figure 6:
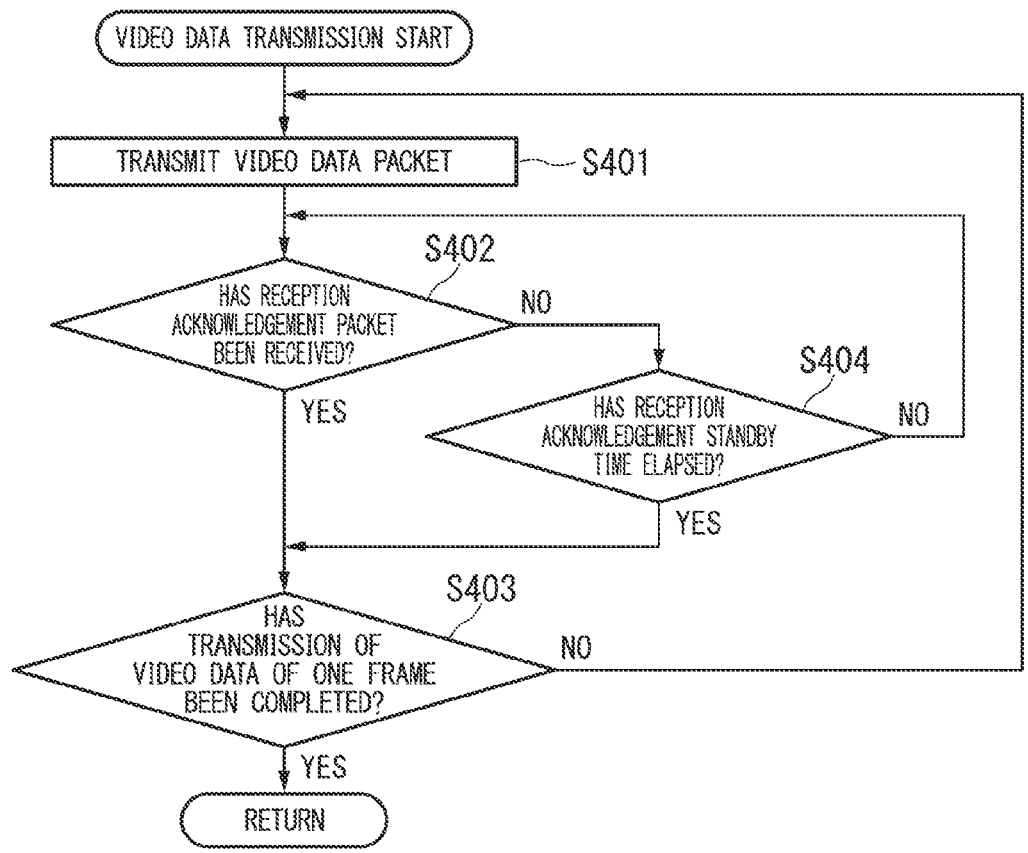
FIG. 6 is a flowchart illustrating an operation process of the video transmitting terminal according to the first embodiment of the present invention.

After the communication path is set, the control unit 101 controls the antenna unit 104 such that video data is transmitted to the video receiving terminal 200 (step S115). FIG. 6 illustrates a detailed operation of the video transmitting terminal 100 when video data is transmitted in step S115. Since video data is transmitted in units of packets, the control unit 101 reads video data corresponding to one packet among video data of a transmission target frame from the RAM 103, and controls the antenna unit 104 such that a video data packet including the video data is transmitted to the video receiving terminal 200 (step S401).

After the video data packet is transmitted, the control unit 101 determines whether or not a reception acknowledgement packet has been received from the video receiving terminal 200 (step S402). The reception acknowledgement packet is a packet transmitted from the video receiving terminal 200 when a video data packet is received. When the reception acknowledgement packet has been received, the control unit 101 determines whether or not the transmission of the video data of one frame has been completed (step S403). When there is a video data packet that is not transmitted yet, the control unit 101 performs transmission of the video data packet in step S401. Further, when the transmission of the video data of one frame has been completed, the transmitting of the video data ends.

Meanwhile, when the reception acknowledgement packet has not been received in step S402, the control unit 101 determines whether or not an elapsed time after the transmission of the video data packet exceeds a predetermined time period during which reception of the reception acknowledgement packet is awaited (step S404). When the elapsed time does not exceed the predetermined time period, the control unit 101 performs the determination of step S402 again. However, when the elapsed time exceeds the predetermined time period, the control unit 101 performs the determination of step S403.

After the transmitting of the video data ends, the control unit 101 determines whether or not an elapsed time after the processing of the slot represented by the variable Slot starts exceeds a predetermined time period of one slot (step S116). When the elapsed time does not exceed the predetermined time period of one slot, the control unit 101 repeats the determination of step S116 until the elapsed time exceeds the predetermined time period of one slot. However, when the elapsed time exceeds the predetermined time period of one slot, the control unit 101 increases the value of the variable Slot by 1 (step S117).

Then, the control unit 101 determines whether or not the value of the variable Slot exceeds the number N (N≥2) of slots of one frame (step S118). When the value of the variable Slot does not exceed the number N of slots of one frame, processing of a slot having a number represented by the variable Slot, that is, processing of a next slot, starts, and a communication path is set in step S114. However, when the value of the variable Slot exceeds the number N of slots of one frame, the control unit 101 sets the operation mode of the antenna 106 to the non-directive mode (step S119).

Then, the control unit 101 determines whether or not a disconnection request packet has been received from the video receiving terminal 200 (step S120). The disconnection request packet is a packet transmitted to request the connection counterpart of the wireless communication to perform a disconnection. When the disconnection request packet has been received, the control unit 101 performs the determination of step S102 again. However, the disconnection request packet has not been received, the control unit 101 determines whether or not a disconnection instruction has been given from the operator based on a signal received from the operating unit 108 (step S121). When the disconnection instruction has been given, the control unit 101 controls the antenna unit 104 such that the disconnection request packet is transmitted to the video receiving terminal 200 (step S122). After the disconnection request packet is transmitted, the control unit 101 performs the determination of step S102 again.

However, when the disconnection instruction has not been given, the control unit 101 controls the antenna unit 104 such that the pilot signal packet that the video receiving terminal 200 uses to update the communication path table is transmitted (step S123). As will be described later, before a one-frame period ends after video data of a frame is transmitted from the video transmitting terminal 100, the video receiving terminal 200 measures communication quality when the pilot signal packet is received from the video transmitting terminal 100, and updates the communication path table based on the measurement result. After the pilot signal packet is transmitted, the control unit 101 performs the determination of step S110 again. Thereafter, when the frame start packet is transmitted in step S111, the same processing as described above is performed in the next frame.

As described above, the video transmitting terminal 100 transmits video data of one frame in each of a plurality of slots in a one-frame period. In each slot, directly after a one-frame period starts, the communication path is set based on the communication path table received from the video receiving terminal 200.

Figure 7:
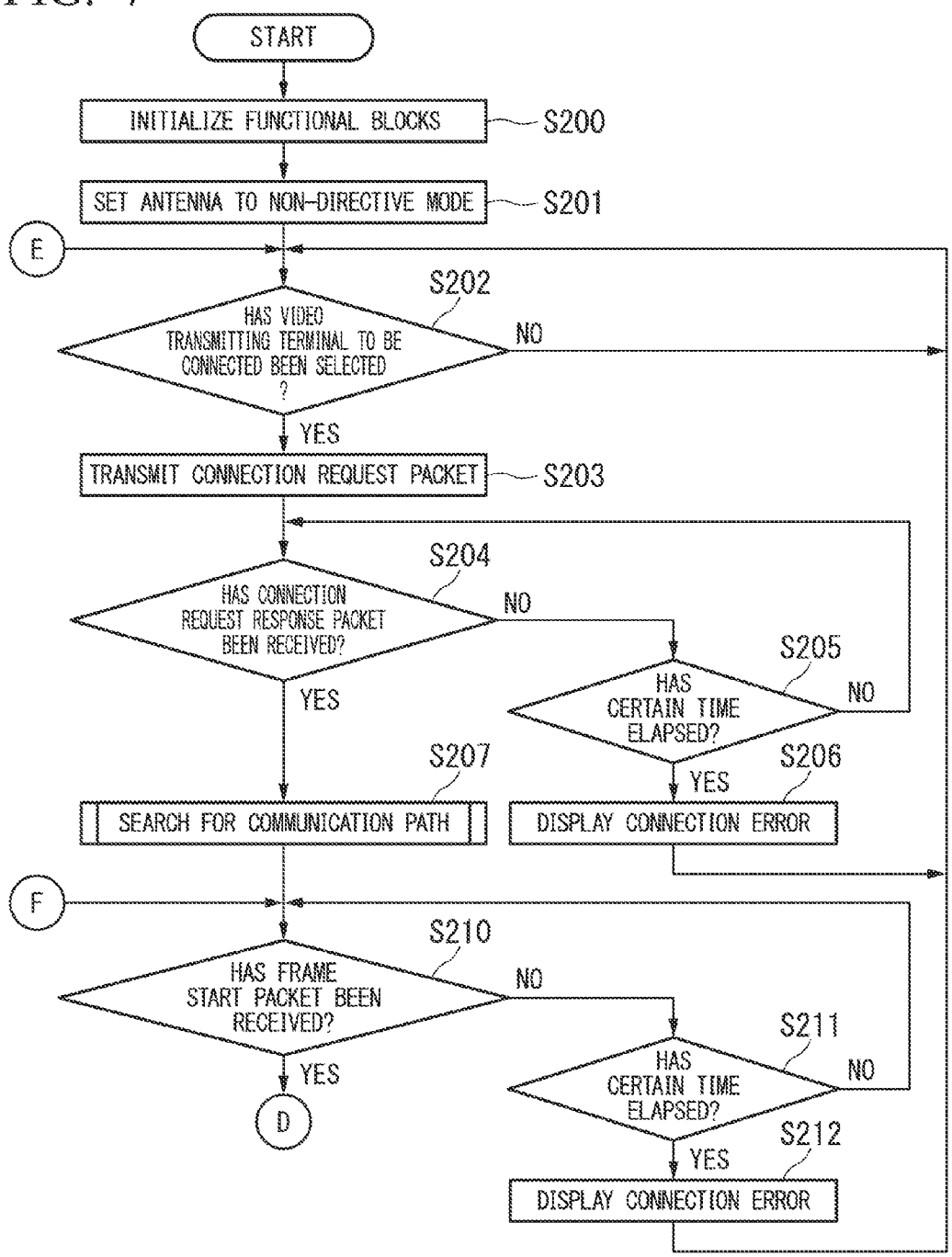
FIG. 7 is a flowchart illustrating an operation process of the video receiving terminal according to the first embodiment of the present invention.
Figure 8:
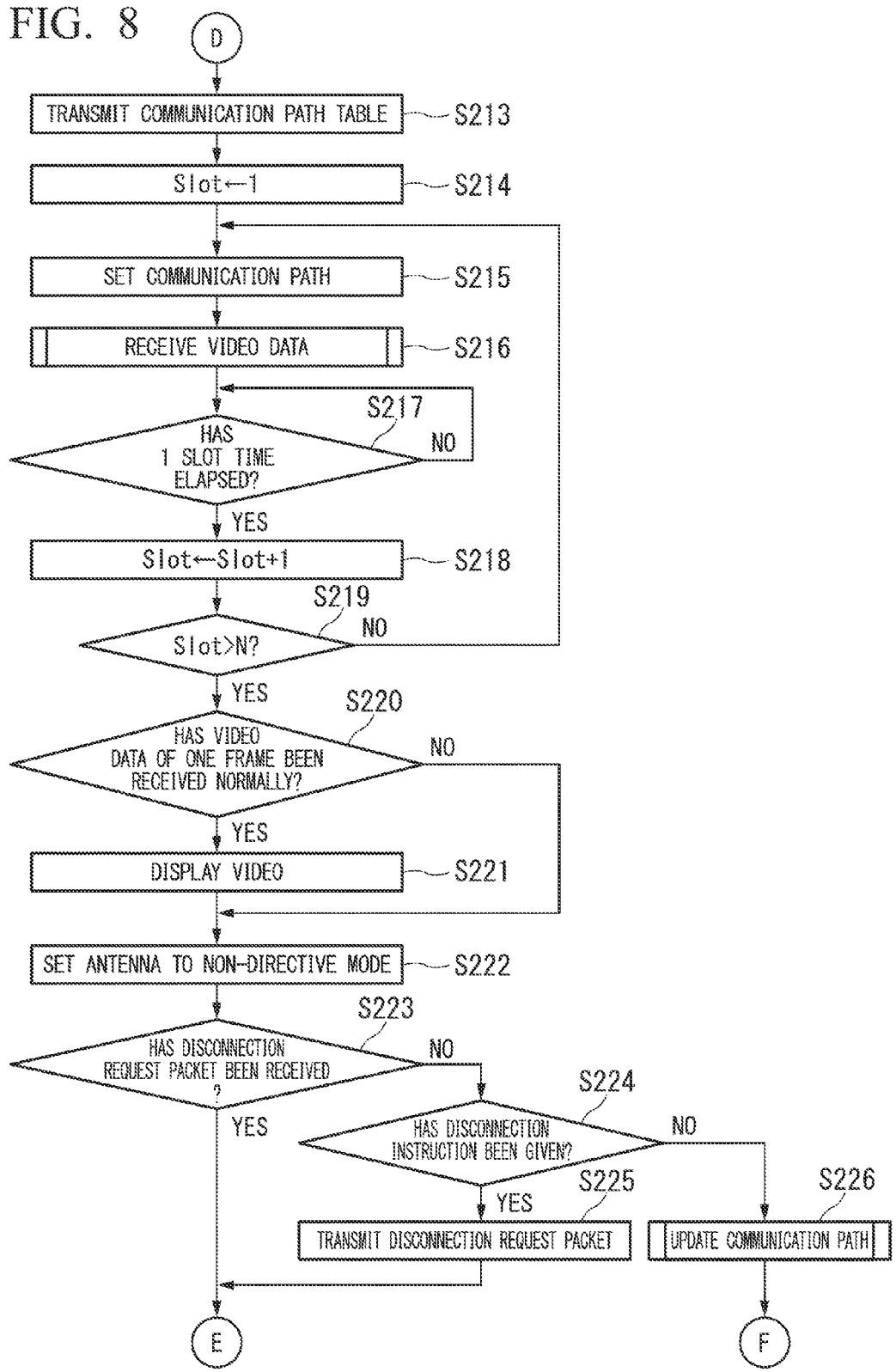
FIG. 8 is a flowchart illustrating an operation process of the video receiving terminal according to the first embodiment of the present invention.

Next, an operation of the video receiving terminal 200 will be described. FIGS. 7 and 8 illustrate an operation of the video receiving terminal 200. When the video receiving terminal 200 is powered on, the control unit 201 initializes the functional blocks of the video receiving terminal 200 (step S200), and then sets the operation mode of the antenna 206 to the non-directive mode (step S201).

In step S200, the functional blocks are initialized, and a communication state table is stored in the RAM 103. The communication state table is a table representing a wireless state of the communication path. FIG. 14 illustrates exemplary content of the communication state table. The communication state table has values of items such as "Path_No," "Tx Direction," "Rx Direction," "RSSI[dBm]," and "Transmit Error." "Path_No" is a number identifying the communication path. "Tx Direction" is a number identifying a pattern of a directional angle to be set to the antenna 106 of the video transmitting terminal 100. "Rx Direction" is a number identifying a pattern of a directional angle to be set to the antenna 206 of the video receiving terminal 200. The numbers of "Tx Direction" and "Rx Direction" correspond to the number of "Direction" in the pattern of the directional angle illustrated in FIG. 12. "RSSI[dBm]" (measurement result information) is a result of measuring a received signal strength indication (RSSI) of the pilot signal packet transmitted from the video transmitting terminal 100. "Transmit Error" is a flag indicating that an amount of communication errors generated during reception of video data exceeds a predetermined threshold value.

When the functional blocks have been initialized, the values of "Path_No," "Tx Direction," and "Rx Direction" are set to previously defined values (a unique combination). Further, when the functional blocks have been initialized, since measurement of the RSSI and detection of a communication error have not been performed, the values of "RSSI[dBm]" and "Transmit Error" are certain initialized values. The communication state table illustrated in FIG. 14 is a communication state table after the measurement of the RSSI and the detection of a communication error are performed.

After the operation mode of the antenna 206 is set to the non-directive mode, the control unit 201 detects the operator's operation content based on a signal received from the operating unit 208 and is on standby until the operator selects the video transmitting terminal 100 of the connection counterpart (step S202). Information from the video transmitting terminal 100 selectable as the connection counterpart is stored in the ROM 202 in advance. When the operator selects the video transmitting terminal 100 of the connection counterpart, the control unit 201 identifies the video transmitting terminal 100 selected as the connection counterpart based on a signal received from the operating unit 108. Further, the control unit 201 controls the antenna unit 204 such that the connection request packet is transmitted to the video transmitting terminal 100 selected as the connection counterpart (step S203).

After the connection request packet is transmitted, the control unit 201 determines whether the connection request response packet has been received from the video transmitting terminal 100 (step S204). When the connection request response packet has not been received, the control unit 201 determines whether or not an elapsed time after the connection request packet is transmitted exceeds a predetermined time period in which reception of the connection request response packet is awaited (step S205). When the elapsed time does not exceed the predetermined time period, the control unit 201 performs the determination of step S204 again. However, when the elapsed time exceeds the predetermined time period, the control unit 201 causes a connection error to be displayed on the monitor 210 (step S206). After the connection error is displayed, the control unit 201 performs the determination of step S202 again.

Figure 9:
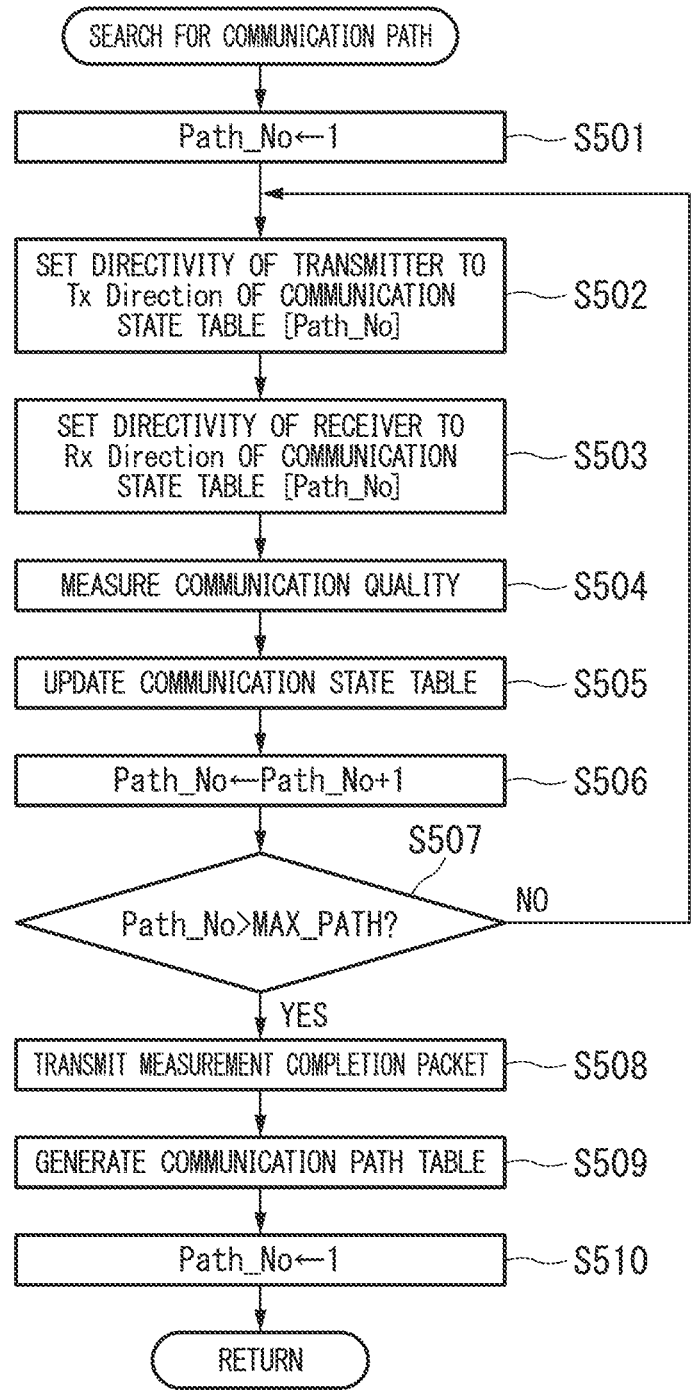
FIG. 9 is a flowchart illustrating an operation process of the video receiving terminal according to the first embodiment of the present invention.

When the connection request response packet is determined to have been received in step S204, a connection with the video transmitting terminal 100 is established. Then, the control unit 201 performs a communication path search for searching for a communication path to be used for wireless communication with the video transmitting terminal 100 (step S207). FIG. 9 illustrates a detailed operation of the video receiving terminal 200 when the communication path search is performed in step S207. The control unit 201 sets a value of Path_No that is a variable identifying a communication path to 1 (step S501).

Then, the control unit 201 controls the antenna unit 204 such that the directivity setting packet including the setting value of the directional angle to be set to the antenna 106 of the video transmitting terminal 100 is transmitted to the video transmitting terminal 100 (step S502). At this time, the control unit 201 reads a number of a pattern of a directional angle of the video transmitting terminal 100 corresponding to a number of a communication path represented by a value of the variable Path_No from the communication state table, reads a setting value of the directional angle corresponding to the read number from the directivity pattern table, and includes the read setting value of the directional angle in the directivity setting packet. For example, when the value of the variable Path_No is 1, 1 is read from the communication state table illustrated in FIG. 14 as the value of "Tx Direction," and 0 that is the value of the directional angle in the horizontal direction and the directional angle in the vertical direction corresponding to this value is read from the directivity pattern table illustrated in FIG. 12. The directivity setting packet includes this value.

After the directivity setting packet is transmitted, similarly, the control unit 201 reads a number of a pattern of a directional angle of the video receiving terminal 200 corresponding to the number of the communication path represented by the value of the variable Path_No from the communication state table, and reads a setting value of the directional angle corresponding to the read number from the directivity pattern table. The control unit 201 sets the directional angle of the antenna 206 to the directional angle represented by the set setting value (step S503). As a result, the antenna 206 operates in the directive mode.

The video transmitting terminal 100 that has received the directivity setting packet transmitted in step S502 transmits the pilot signal packet in step S104. After the directional angle of the antenna 206 is set, the control unit 201 controls the antenna unit 204 such that the pilot signal packet is received from the video transmitting terminal 100, measures the communication quality (RSSI) at that time and measures the wireless state of the communication path (step S504), and updates the communication state table based on the measurement result (step S505). In step S505, in the communication state table, the value of "RSSI[dBm]" corresponding to the number of the communication path represented by the value of the variable Path_No is updated.

After the communication state table is updated, the control unit 201 increases the value of the variable Path_No by 1 (step S506). Then, the control unit 201 determines whether or not the value of the variable Path_No exceeds the number MAX_PATH (81 in the example of FIG. 14) of communication paths held in the communication state table (step S507). When the value of the variable Path_No does not exceed MAX_PATH, in order to measure a wireless state of a communication path whose wireless state has not been measured, the control unit 201 causes the process to proceed to step S502. However, when the value of the variable Path_No exceeds MAX_PATH, the measuring of the wireless state on all the communication paths ends. In this case, the control unit 201 controls the antenna unit 204 such that the measurement completion packet is transmitted to the video transmitting terminal 100 (step S508).

After the measurement completion packet is transmitted, the control unit 201 selects N (N is the number of slots in a one-frame period) communication paths having good communication quality from among the communication paths included in the communication state table, and generates a communication path table including the selected communication paths information (step S509). In step S509, N communication paths are selected from among the communication paths included in the communication state table, for example, in descending order of communication quality. The generated communication path table is stored in the RAM 203. After the communication path table is generated, the control unit 201 sets the value of the variable Path_No to 1 (step S510). Then, the communication path search ends.

After the communication path search ends, the control unit 201 determines whether or not the frame start packet has been received from the video transmitting terminal 100 (step S210). When the frame start packet has not been received, the control unit 201 determines whether or not an elapsed time after the measurement completion packet is transmitted exceeds a predetermined time period in which reception of the frame start packet is awaited (step S211). When the elapsed time does not exceed the predetermined time period, the control unit 201 performs the determination of step S210 again. However, when the elapsed time exceeds the predetermined time period, the control unit 201 causes the connection error to be displayed on the monitor 210 (step S212). After the connection error is displayed, the control unit 201 performs the determination of step S202 again.

When the frame start packet has been received, the control unit 201 controls the antenna unit 204 such that the communication path table is transmitted to the video transmitting terminal 100 (step S213). After the communication path table is transmitted, the control unit 201 sets the value of the variable Slot representing the slot number to 1 (step S214). As a result, processing of the first slot starts. Then, the control unit 201 reads the number of the pattern of the directional angle corresponding to the slot number represented by the value of the variable Slot from the communication path table, reads the setting value of the directional angle corresponding to the read number from the directivity pattern table, and sets the directional angle of the antenna 106 to the directional angle represented by the read setting value (step S215). As a result, a communication path is set. For example, when the value of the variable Slot is 1, 1 is read from the communication path table illustrated in FIG. 13 as the value of "Rx Direction," and 0 that is the value of the directional angle in the horizontal direction and the directional angle in the vertical direction corresponding to this value is read from the directivity pattern table illustrated in FIG. 12.

Figure 10:
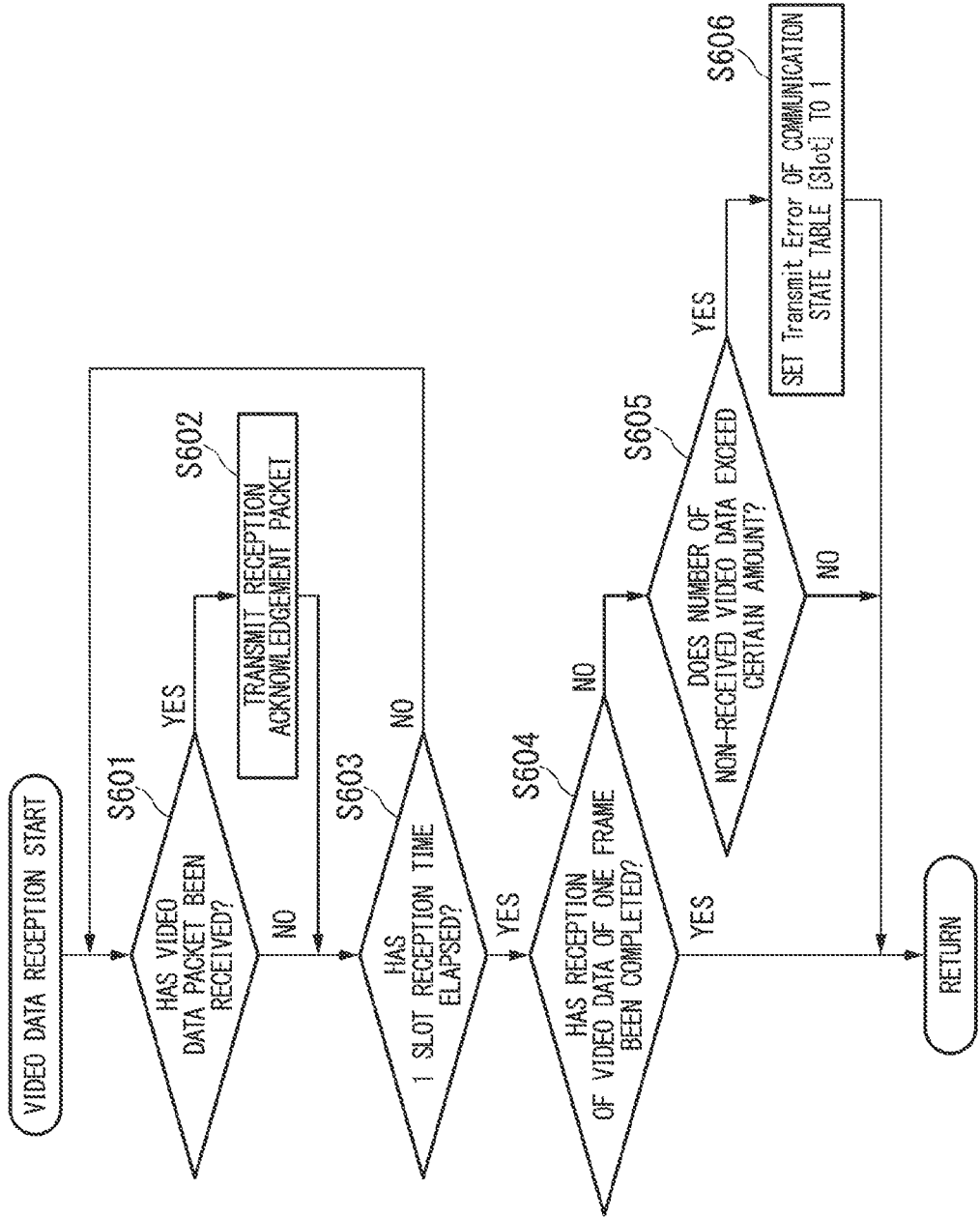
FIG. 10 is a flowchart illustrating an operation process of the video receiving terminal according to the first embodiment of the present invention.

After the communication path is set, the control unit 201 controls the antenna unit 204 such that video data is received from the video transmitting terminal 100 (step S216). FIG. 10 illustrates a detailed operation of the video receiving terminal 200 when the video data is received in step S216. The control unit 201 determines whether or not the video data packet has been received from the video transmitting terminal 100 (step S601). When the video data packet has been received, the control unit 201 controls the antenna unit 204 such that the reception acknowledgement packet is transmitted to the video transmitting terminal 100 (step S602).

After the reception acknowledgement packet is transmitted or when the video data packet is determined not to have been received in step S601, the control unit 201 determines whether or not an elapsed time after the processing of the slot represented by the variable Slot starts exceeds a predetermined reception time period allocated for reception in one slot (step S603). When the elapsed time does not exceed the reception time period, the control unit 201 performs the determination of step S601 again. However, when the elapsed time exceeds the reception time period, the control unit 201 determines whether or not video data of one frame has been completely received in the time period of one slot (step S604).

Through the respective slots, data obtained by dividing video data of one frame into two or more is stored in video data packets, and the video data packets are sequentially transmitted from the video transmitting terminal 100 to the video receiving terminal 200. A sequence number representing a sequence in one frame is added to each video data packet, and a flag representing an end of video data is added to a video data packet storing last video data of one frame. The control unit 201 checks the sequence number added to the video data packet, and detects a video data packet that has not been received due to a communication error. Further, when the video data packet to which the flag representing the end of the video data is added has not been received, the control unit 201 determines that the video data packet storing the last video data of one frame has not been received.

When all the video data packets have been received, the receiving of the video data ends.

Further, when one or more video data packets have not been received, the control unit 201 determines whether or not the number of video data packets that have not been received exceeds a predetermined amount (step S605). When the number of video data packets that have not been received does not exceed the predetermined amount, the receiving of the video data ends. However, when the number of video data packets that have not been received exceeds the predetermined amount, the control unit 201 sets the value of "Transmit Error" of the communication path used to receive the video data packet to 1 in the communication state table (step S606). For example, in the first slot (slot=1) in a one-frame period, the communication path whose number (Path_No) is 1 is used as illustrated in the communication path table of FIG. 13, and thus in step S606, in the communication state table, the value of "Transmit Error" of the communication path whose number (Path_No) is 1 is 1. Then, the receiving of the video data ends.

After the receiving of the video data ends, the control unit 201 determines whether or not an elapsed time after the processing of the slot represented by the variable Slot exceeds a predetermined time period of one slot (step S217). When the elapsed time does not exceed the time period of one slot, the control unit 201 repeats the determination of step S217 until the elapsed time exceeds the time period of one slot. However, when the elapsed time exceeds the time period of one slot, the control unit 201 increases the value of the variable Slot by 1 (step S218).

Then, the control unit 201 determines whether or not the value of the variable Slot exceeds the number N (N≥2) of slots of one frame (step S219). When the value of the variable Slot does not exceed the number N of slots of one frame, processing of a slot having a number represented by the variable Slot, that is, processing of a next slot, starts, and a communication path is set in step S215. However, when the value of the variable Slot exceeds the number N of slots of one frame, the control unit 201 determines whether or not video data of one frame has been received normally (step S220).

When all the video data packets have been received in one of the N slots, since video data of one frame can be configured with data of the video data packets, video data of one frame is determined to have been received normally. Further, even when a communication error occurs in all slots and it is difficult to configure video data of one frame with only data of the video data packet received in one slot, if it is possible to configure video data of one frame by complementing the video data packets received in the slots, video data of one frame is determined to have been received normally. However, when it is difficult to configure video data of one frame even by complementing the video data packets received in the slots, video data of one frame is determined not to have been received normally.

When video data of one frame is determined to have been received normally, the control unit 201 generates video data of one frame by combining data of the video data packets, causes the video signal processing unit 207 to process the video data, and causes the monitor 210 to display a video based on the video data (step S221). In step S221, the control unit 201 generates video data of one frame by combining data of the video data packets in a plurality of slots as necessary. For example, when m-th data configuring video data of one frame has been received in the first slot but has not been received in the second slot, and (m+1)-th data configuring video data of one frame has not been received in the first slot but has been received in the second slot, insufficient data is complemented by combining the m-th data received in the first slot with the (m+1)-th data received in the second slot.

After the video is displayed or when video data of one frame is determined not to have been received normally in step S220, the control unit 201 sets the operation mode of the antenna 206 to the non-directive mode (step S222). Then, the control unit 201 determines whether or not the disconnection request packet has been received from the video transmitting terminal 100 (step S223). When the disconnection request packet has been received, the control unit 201 performs the determination of step S202 again. However, when the disconnection request packet has not been received, the control unit 201 determines whether or not a disconnection instruction has been given from the operator based on a signal received from the operating unit 208 (step S224). When the disconnection instruction has been given, the control unit 201 controls the antenna unit 204 such that the disconnection request packet is transmitted to the video transmitting terminal 100 (step S225). After the disconnection request packet is transmitted, the control unit 201 performs the determination of step S202 again.

Figure 11:
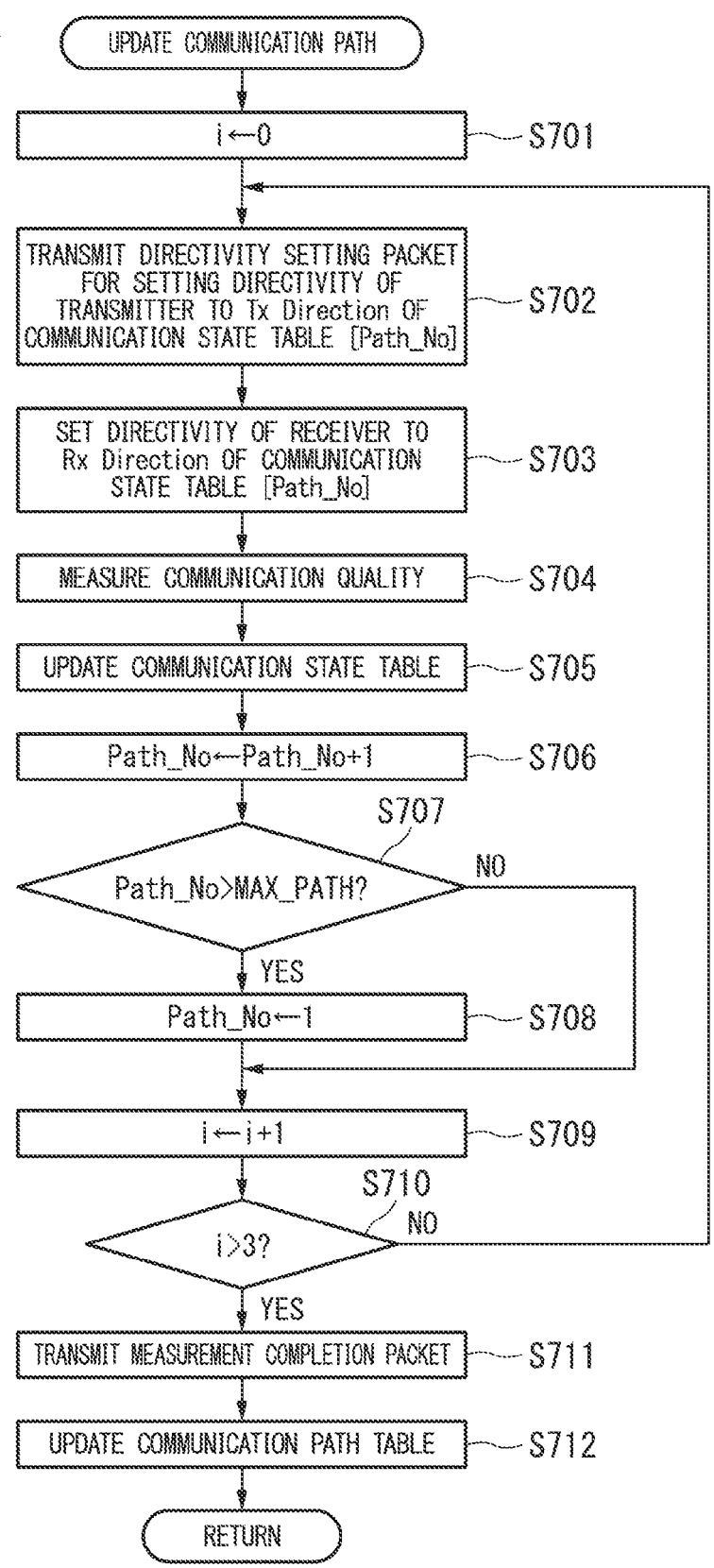
FIG. 11 is a flowchart illustrating an operation process of the video receiving terminal according to the first embodiment of the present invention.

However, when the disconnection instruction has not been given, the control unit 201 measures the wireless state of the communication path again, and performs a communication path update of updating the communication state table and the communication path table (step S226). FIG. 11 illustrates a detailed operation of the video receiving terminal 200 when the communication path update is performed in step S226. The control unit 201 sets a value of a variable i for controlling repetition of processing to 0 (step S701).

Then, the control unit 201 controls the antenna unit 204 such that the directivity setting packet including the setting value of the directional angle to be set to the antenna 106 of the video transmitting terminal 100 is transmitted to the video transmitting terminal 100 (step S702). At this time, the control unit 201 reads the number of the pattern of the directional angle of the video transmitting terminal 100 corresponding to the number of the communication path represented by the value of the variable Path_No from the communication state table, reads the setting value of the directional angle corresponding to the read number, and includes the read setting value of the directional angle in the directivity setting packet.

After the directivity setting packet is transmitted, similarly, the control unit 201 reads a number of a pattern of a directional angle of the video receiving terminal 200 corresponding to the number of the communication path represented by the value of the variable Path_No from the communication state table, and reads a setting value of the directional angle corresponding to the read number from the directivity pattern table. The control unit 201 sets the directional angle of the antenna 206 to the directional angle represented by the set setting value (step S703). As a result, the antenna 206 operates in the directive mode.

The video transmitting terminal 100 that has received the directivity setting packet transmitted in step S702 transmits the pilot signal packet in step S123. After the directional angle of the antenna 206 is set, the control unit 201 receives the pilot signal packet from the video transmitting terminal 100, measures the communication quality (RSSI), measures the wireless state of the communication path (step S704), and updates the communication state table based on the measurement result (step S705). In step S705, in the communication state table, the value of "RSSI[dBm]" corresponding to the number of the communication path represented by the value of the variable Path_No is updated.

After the communication state table is updated, the control unit 201 increases the value of the variable Path_No by 1 (step S706). Then, the control unit 201 determines whether or not the value of the variable Path_No exceeds the number MAX_PATH (81 in the example of FIG. 14) of communication paths whose information is held in the communication state table (step S707). When the value of the variable Path_No exceeds MAX_PATH, the control unit 201 sets the value of the variable Path_No to 1 (step S708).

After the value of the variable Path_No is set or when the value of the variable Path_No does not exceed MAX_PATH, the control unit 201 increases the value of the variable i by 1 (step S709). Then, the control unit 201 determines whether or not the value of the variable i exceeds 3 (step S710). When the value of the variable i does not exceed 3, the control unit 201 performs the process of step S702 again. However, when the value of the variable i exceeds 3, the control unit 201 controls the antenna unit 204 such that the measurement completion packet is transmitted to the video transmitting terminal 100 (step S711).

After the measurement completion packet is transmitted, the control unit 201 selects N (N is the number of slots in a one-frame period) communication paths having good communication quality from among the communication paths included in the communication state table, and updates the communication path table by overwriting the communication path table information with the selected communication path information (step S712). In step S712, N communication paths are selected from among the communication paths included in the communication state table, for example, in descending order of communication quality. In step S712, a communication path in which the value of "Transmit Error" of the communication state table is 0 is selected preferentially over a communication path in which the value of "Transmit Error" of the communication state table is 1. In other words, the communication path in which many communication errors have occurred when video data is received is unlikely to be selected as the communication path to be used in a next frame period. Then, the communication path update ends.

In the communication path update, the process of step S702 to S705 is performed until the value of the variable i reaches 4, and thus the communication state table is updated with the 4 communication paths information in a one-frame period. Specifically, in the communication path update in the first frame period, the value of the variable Path_No changes from 1 to 4, and thus information in the communication state table is updated from 1 to 4 as the number of the communication path.

Further, in the communication path update in the next frame period, since the value of the variable Path_No changes from 5 to 8, information in the communication state table is updated from 5 to 8 as the number of the communication paths. In subsequent frames, the communication state table information is similarly updated. The number of communication paths whose information is updated through the communication path update in a one-frame period may be 4 as described above and is preferably one or more.

After the communication path update ends, the control unit 201 performs the determination of step S210 again. Thereafter, when the frame start packet is received in step S210, the same process as described above is performed in the next frame.

As described above, the video receiving terminal 200 receives video data of one frame in each of a plurality of slots in a one-frame period unless a communication error occurs. In each slot, the communication path is set based on the communication path table generated or updated directly before a one-frame period starts.

Figure 15:
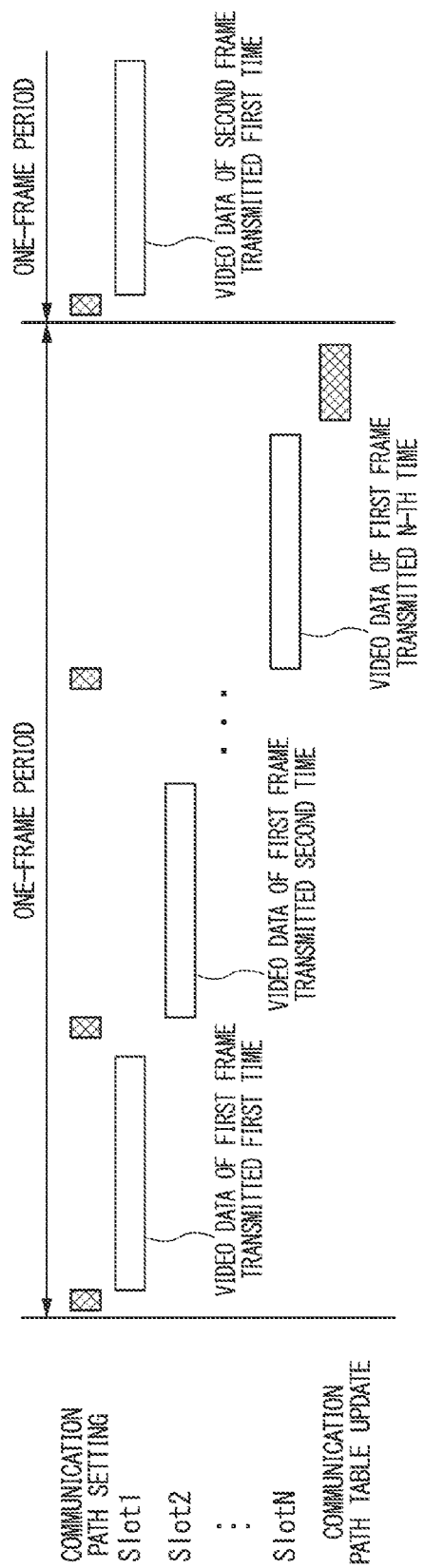
FIG. 15 is a reference diagram illustrating an example of transmitting video data from a video transmitting terminal to a video receiving terminal according to the first embodiment of the present invention.

FIG. 15 illustrates an example in which video data is transmitted from the video transmitting terminal 100 to the video receiving terminal 200 through the above process. In FIG. 15, time passes to the right. The communication path is set between the video transmitting terminal 100 and the video receiving terminal 200 at the beginning of each slot in a one-frame period (steps S114 and S215), and video data of the same frame is transmitted and received (steps S115 and S216). When transmission and reception of video data of an N-th slot end, the communication path table is updated within the same frame period as the frame period in which the transmission and reception of video data are performed (step S226).

As described above, according to the present embodiment, since video data of one frame is transmitted in each of a plurality of communication paths in the same frame period, video data of one frame is properly transmitted through any one communication path unless a communication failure occurs in all the communication paths, and thus a video is unlikely to be interrupted.

Further, the video receiving terminal 200 measures the wireless state of the communication path and transmits the communication path table to the video transmitting terminal 100 based on the measurement result, and thus it is possible to automatically notify the video transmitting terminal 100 of a change in the communication path.

Further, when transmission and reception of video data of a plurality of frames are performed, the wireless state of the communication path is measured before transmission and reception of video data of a first frame, and thus it is possible to use the communication path having a good wireless state when the wireless state is measured for transmission and reception of video data directly after the measurement.

Thus, communication reliability is improved, and a video is unlikely to be interrupted.

Further, when transmission and reception of video data of a plurality of frames are performed, the wireless state of the communication path is measured, and the communication path table is updated before a one-frame period ends after transmission and reception of video data ends in all slots in the one-frame period, and thus when transmission and reception of video data are performed in a next frame period, it is possible to use the communication path having the good wireless state when the wireless state is measured immediately before. Thus, communication reliability is improved, and a video is unlikely to be interrupted.

Since as much time as possible is allocated to transmission and reception of video data in a one-frame period, in the update of the communication path table performed at the end of one-frame period, information belonging to some communication paths among all the selectable communication paths is updated. In this update, information belonging to a communication path different from a communication path whose information has been updated in an immediately previous frame period is updated. Thus, information can be updated with bias toward a specific communication path. Thus, communication reliability is improved, and a video is unlikely to be interrupted.

Further, as video data of one frame is generated by combining data of the video data packets received in a plurality of slots, a video is unlikely to be interrupted even when a communication failure has occurred in any one communication path such that the video data packet has not been received.

Second Embodiment

A second embodiment of the present invention will now be described. The video transmitting terminal 100 and the video receiving terminal 200 according to the present embodiment have configurations similar to the terminals according to the first embodiment. In the first embodiment, the video receiving terminal 200 measures the wireless state of each communication path, and transmits the communication path table to the video transmitting terminal 100. However, in the second embodiment, the video transmitting terminal 100 measures the wireless state of each communication path, and transmits the communication path table to the video receiving terminal 200. In the second embodiment, the communication state table is stored in the RAM 103 of the video transmitting terminal 100.

Figure 16:
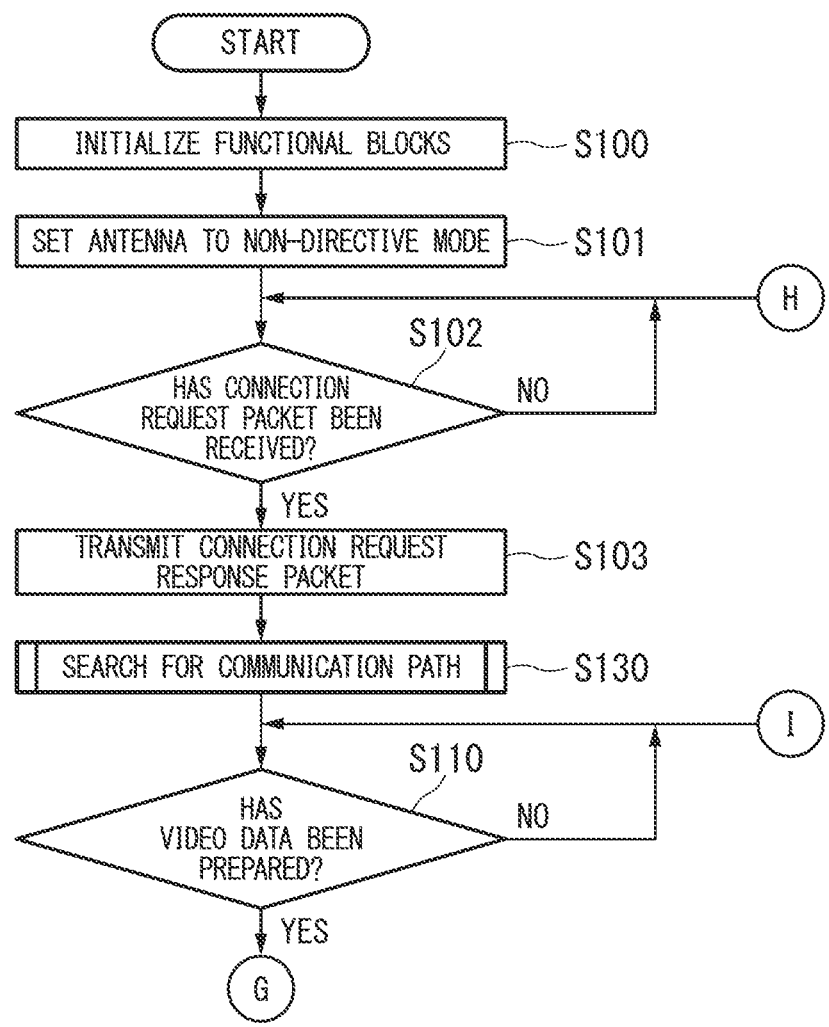
FIG. 16 is a flowchart illustrating an operation process of a video transmitting terminal according to a second embodiment of the present invention.
Figure 17:
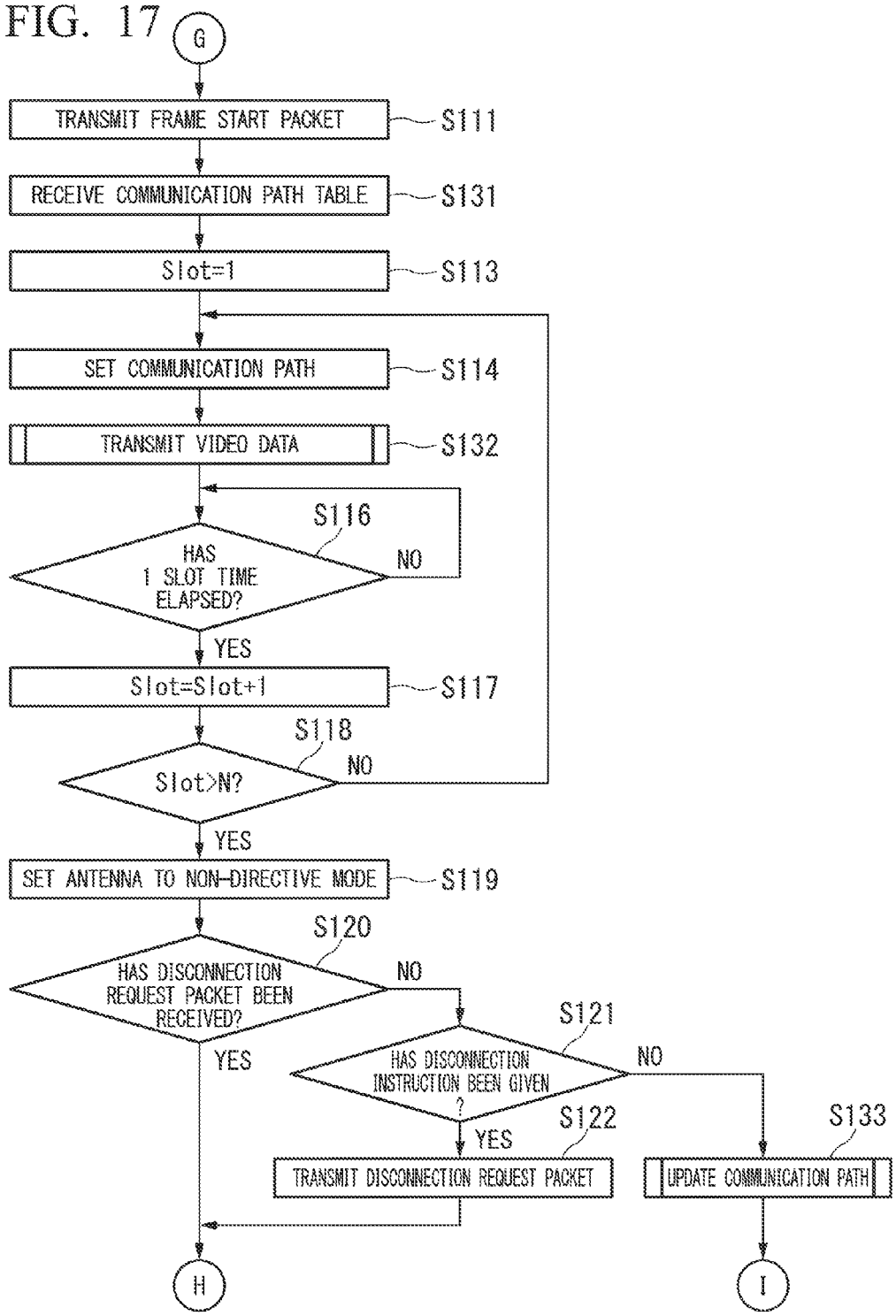
FIG. 17 is a flowchart illustrating an operation process of the video transmitting terminal according to a second embodiment of the present invention.

An operation of the video transmitting terminal 100 is described below. FIGS. 16 and 17 illustrate an operation of the video transmitting terminal 100. Processes illustrated in FIGS. 16 and 17 are similar to the processes illustrated in FIGS. 3 and 4 except for the processes described below. In the present embodiment, in step S103, the connection request response packet is transmitted, and then the communication path search (S130) is performed. A process performed in the communication path search (S130) is similar to the process illustrated in FIG. 9 except for the process of steps S502 and S503.

In step S502, the control unit 101 reads the number of the pattern of the directional angle of the video transmitting terminal 100 corresponding to the number of the communication path represented by the value of the variable Path_No from the communication state table, and reads the setting value of the directional angle corresponding to the read number from the directivity pattern table. Further, the control unit 101 sets the directional angle of the antenna 106 to the directional angle represented by the read setting value. As a result, the antenna 106 operates in the directive mode.

In step S503, the control unit 101 controls the antenna unit 104 such that the directivity setting packet including the setting value of the directional angle to be set to the antenna 206 of the video receiving terminal 200 is transmitted to the video receiving terminal 200. At this time, the control unit 101 reads the number of the pattern of the directional angle of the video receiving terminal 200 corresponding to the number of the communication path represented by the value of the variable Path_No from the communication state table, reads the setting value of the directional angle corresponding to the read number from the directivity pattern table, and includes the read setting value of the directional angle in the directivity setting packet.

Further, in the present embodiment, after the frame start packet is transmitted in step S111, the control unit 101 controls the antenna unit 104 such that the communication path table is transmitted to the video receiving terminal 200 (step S131).

Figure 18:
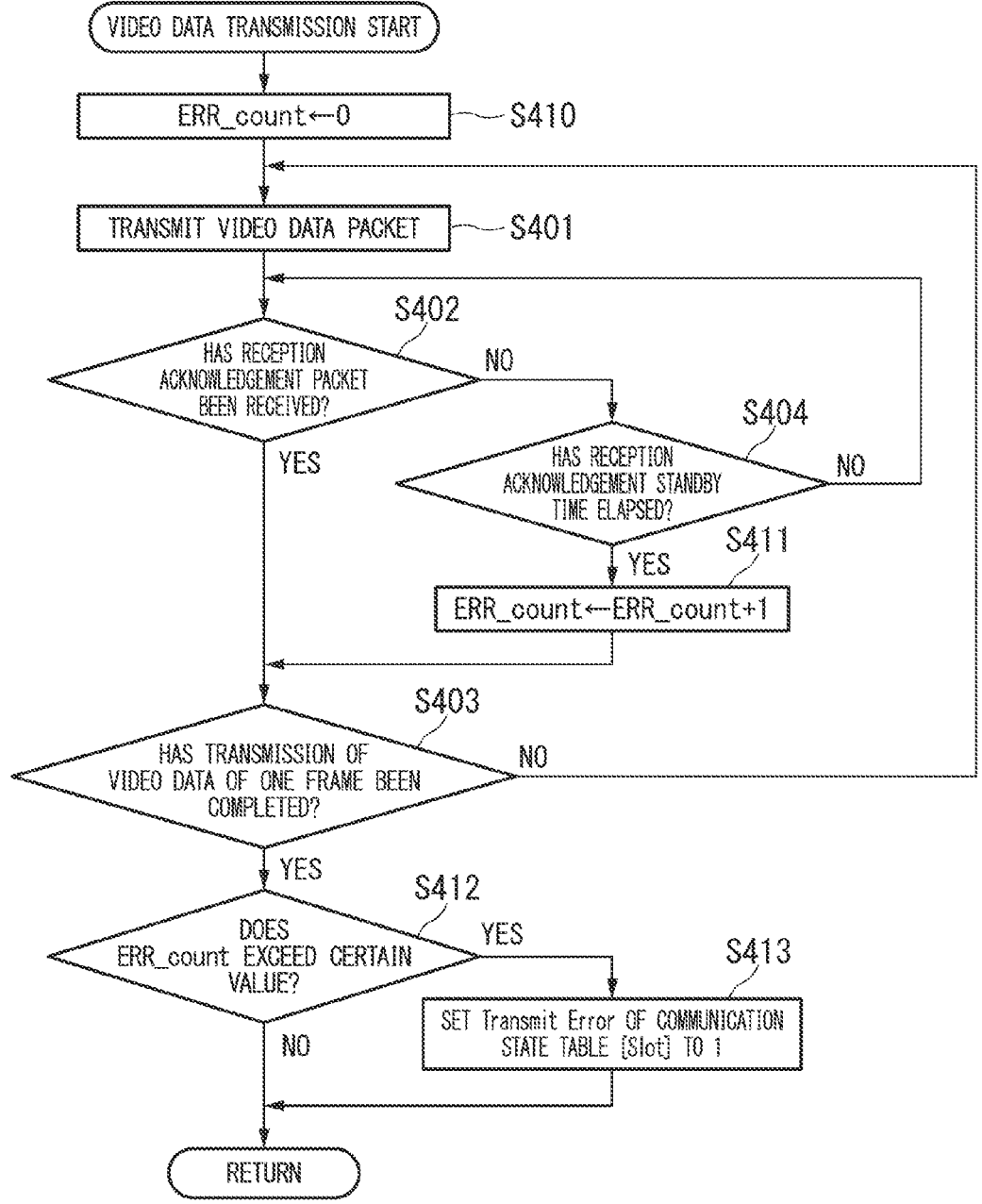
FIG. 18 is a flowchart illustrating an operation process of the video transmitting terminal according to a second embodiment of the present invention.

Further, in the present embodiment, a detailed operation of transmission of video data (step S132) after the communication path is set in step S114 is different from the detailed operation of transmission of video data (step S115) according to the first embodiment. FIG. 18 illustrates a detailed operation of the video transmitting terminal 100 when video data is transmitted in step S132.

The control unit 101 sets a value of a variable ERR_count for counting the number of video data packets in which a communication error has occurred to 0 (step S410). The process of step S401 to S404 is the same as in the first embodiment, and a description thereof is omitted. When an elapsed time after the video data packet is transmitted in step S404 exceeds a predetermined time period in which reception of the reception acknowledgement packet is awaited, the control unit 101 increases the value of the variable ERR_count by 1 (step S411). Then, the process of step S403 is performed.

When transmission of video data of one frame has been completed in step S403, the control unit 101 determines whether or not the value of the variable ERR_count exceeds a predetermined value (step S412). The value of the variable ERR_count represents the number of reception acknowledgement packets that the video transmitting terminal 100 has not received from the video receiving terminal 200, that is, the number of video data packets that have not been received by the video receiving terminal 200. When the value of the variable ERR_count does not exceed the predetermined value, the transmission of video data ends. However, when the value of the variable ERR_count exceeds the predetermined value, the control unit 101 sets the value of "Transmit Error" of the communication path used for the transmission of the video data packet to 1 (step S413). For example, in the first slot (Slot=1) in a one-frame period, since a communication path whose number (Path_No) is 1 is used as illustrated in the communication path table of FIG. 13, the value of "Transmit Error" of the communication path whose number (Path_No) is 1 is set to 1 in the communication state table in step S413. Then, the transmitting of video data ends.

Further, in the present embodiment, when the disconnection instruction is determined not to have been given in step S121, the communication path update (S133) is performed. A process performed in the communication path update (S133) is similar to the process illustrated in FIG. 11 except for the process of steps S702 and S703.

In step S702, the control unit 101 reads the number of the pattern of the directional angle of the video transmitting terminal 100 corresponding to the number of the communication path represented by the value of the variable Path_No from the communication state table, and reads the setting value of the directional angle corresponding to the read number from the directivity pattern table. Further, the control unit 101 sets the directional angle of the antenna 106 to the directional angle represented by the read setting value. As a result, the antenna 106 operates in the directive mode.

In step S703, the control unit 101 controls the antenna unit 104 such that the directivity setting packet including the setting value of the directional angle to be set to the antenna 206 of the video receiving terminal 200 is transmitted to the video receiving terminal 200. At this time, the control unit 101 reads the number of the pattern of the directional angle of the video receiving terminal 200 corresponding to the number of the communication path represented by the value of the variable Path_No from the communication state table, reads the setting value of the directional angle corresponding to the read number from the directivity pattern table, and includes the read setting value of the directional angle in the directivity setting packet.

Figure 19:
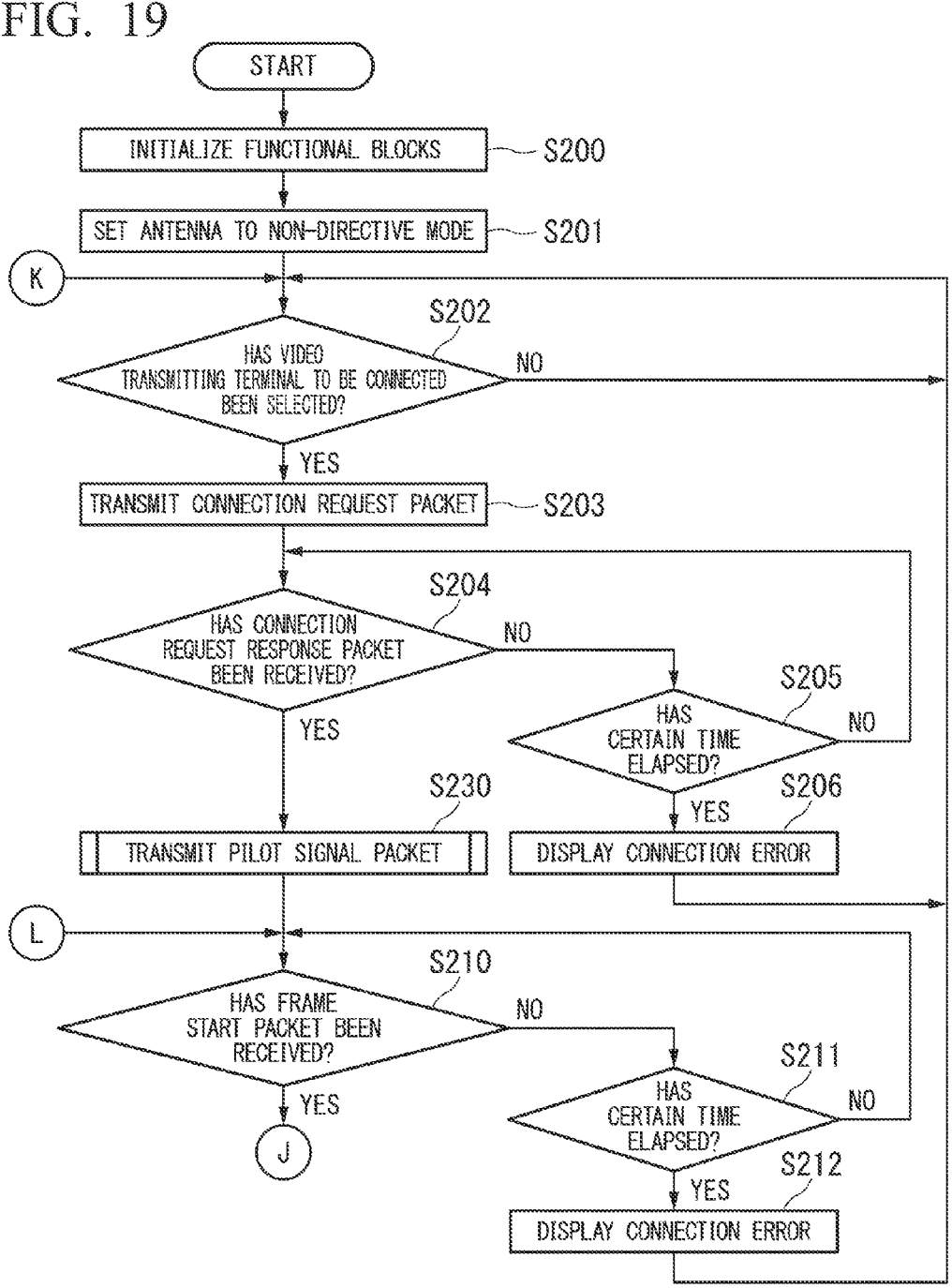
FIG. 19 is a flowchart illustrating an operation process of a video receiving terminal according to the second embodiment of the present invention.
Figure 20:
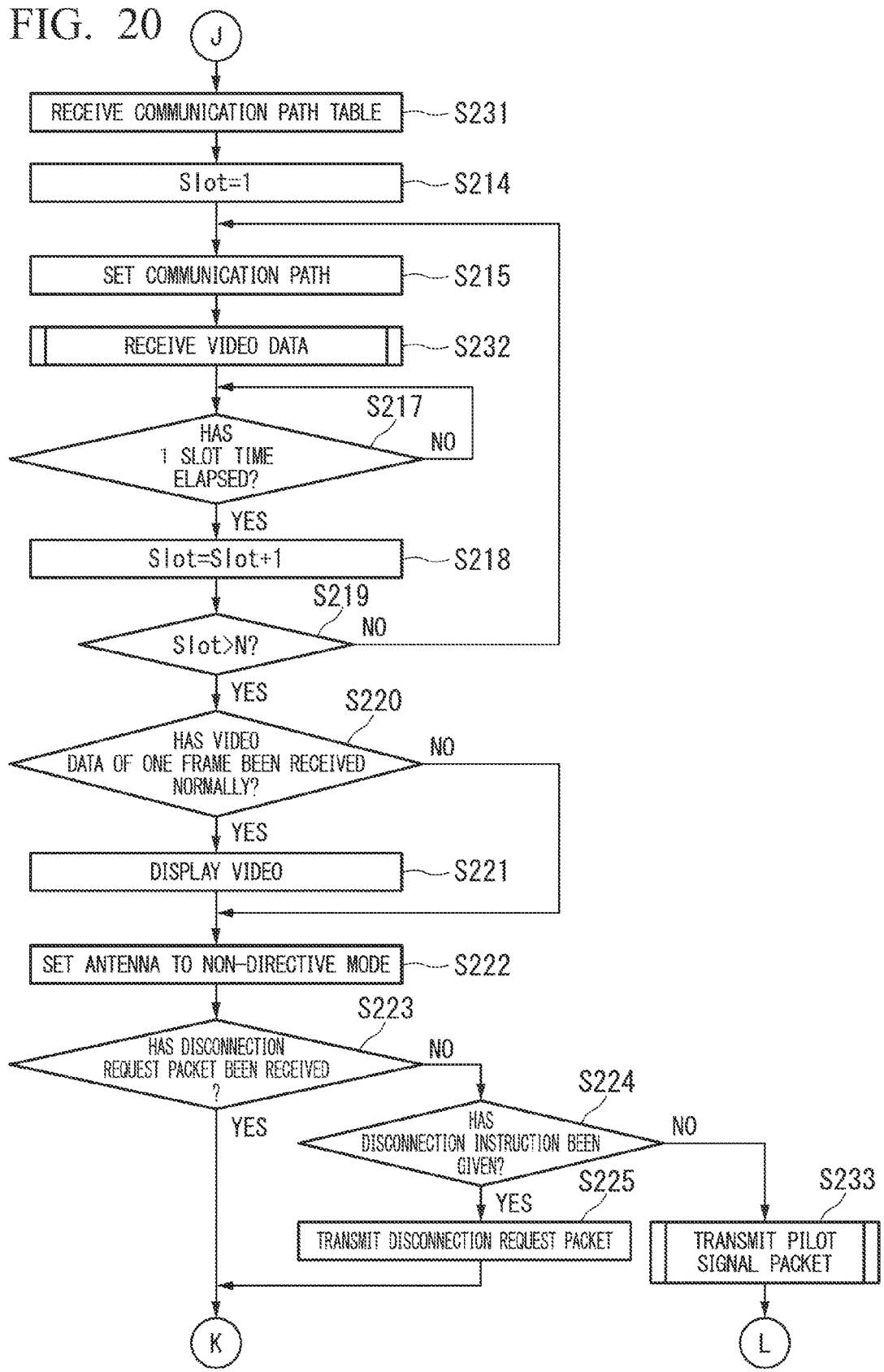
FIG. 20 is a flowchart illustrating an operation process of the video receiving terminal according to the second embodiment of the present invention.

Next, an operation of the video receiving terminal 200 will be described. FIGS. 19 and 20 illustrate an operation of the video receiving terminal 200. Processes illustrated in FIGS. 19 and 20 are similar to the processes illustrated in FIGS. 7 and 8 except for the processes described below. In the present embodiment, when the connection request response packet is determined to have been received in step S204, transmission of the pilot signal packet is performed (step S230). A process performed in the transmission of the pilot signal packet (step S230) is similar to the process illustrated in FIG. 5.

Further, in the present embodiment, when the frame start packet is determined to have been received in step S210, the control unit 201 controls the antenna unit 204 such that the communication path table is received from the video transmitting terminal 100 (step S231).

Figure 21:
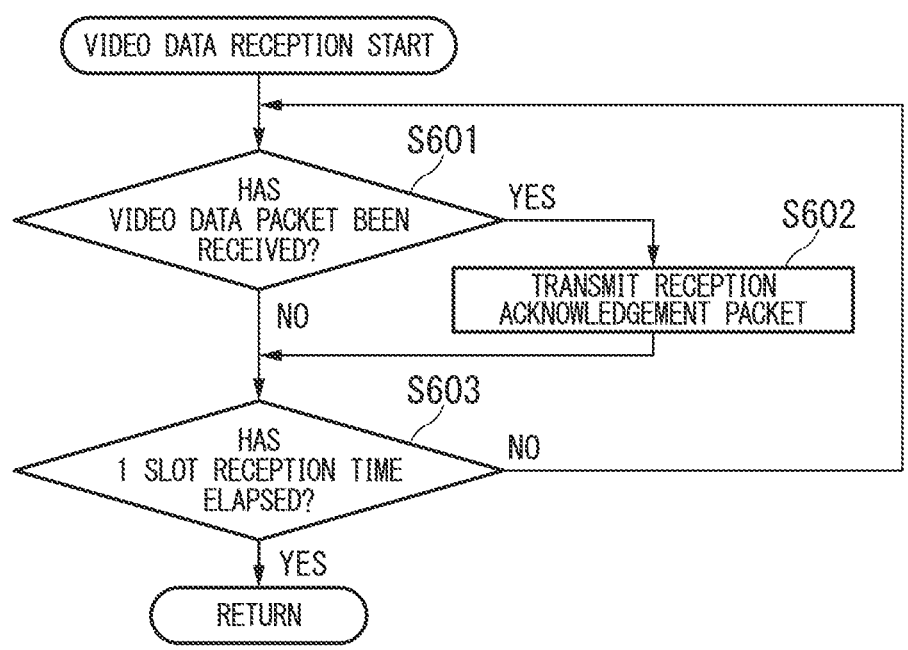
FIG. 21 is a flowchart illustrating an operation process of the video receiving terminal according to the second embodiment of the present invention.
Figure 22:
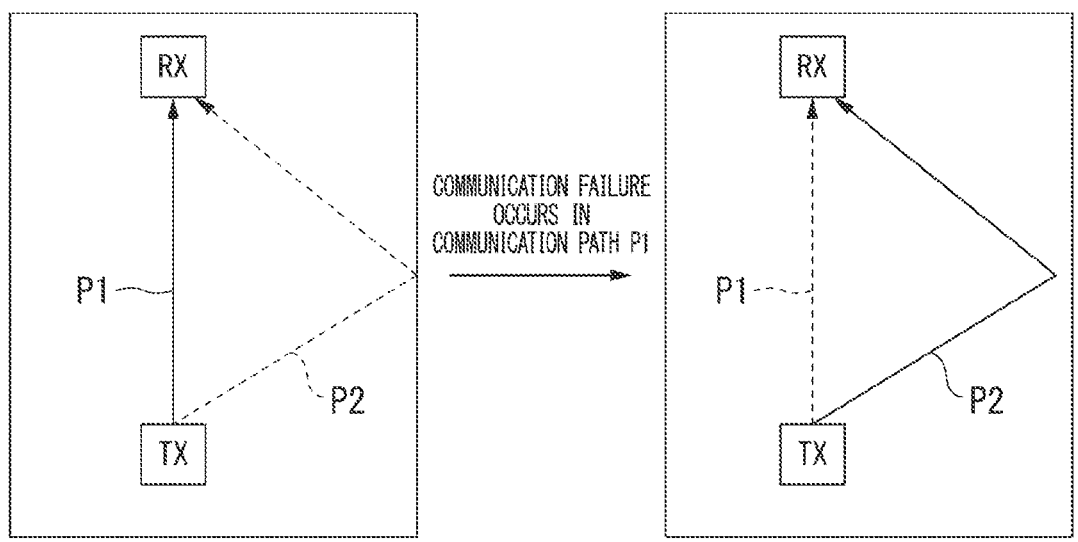
FIG. 22 is a reference diagram illustrating an example in which a communication path is changed due to the occurrence of a communication failure.
Figure 23:
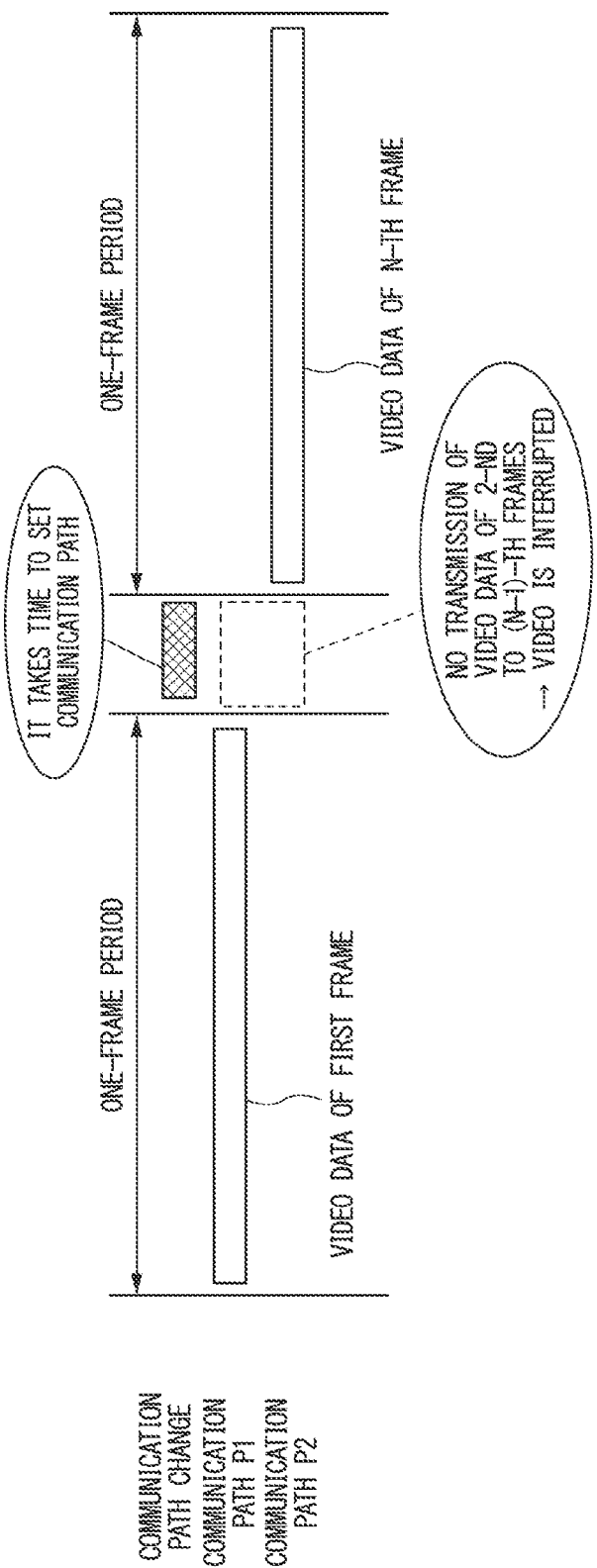
FIG. 23 is a reference diagram illustrating an example of transmitting video data from a video transmitting terminal to a video receiving terminal according to a related art.

Further, in the present embodiment, a detailed operation of reception of video data (step S232) after the communication path is set in step S215 is different from the detailed operation of the reception of the video data (step S216) according to the first embodiment. FIG. 21 illustrates a detailed operation of the video receiving terminal 200 when video data is received in step S232.

A process of steps S601 to S603 is similar to the process of steps S601 to S603 illustrated in FIG. 10. When an elapsed time after the processing of the slot represented by the variable Slot exceeds a predetermined time period of one slot in step S603, the receiving of video data ends.

Further, in the present embodiment, when the disconnection instruction is determined to have not been given in step S224, transmission of the pilot signal packet is performed (step S233). A process performed in the transmission of the pilot signal packet (step S233) is similar to the process illustrated in FIG. 5.

In the present embodiment, similarly to the first embodiment, since video data of one frame is transmitted in each of a plurality of communication paths in the same frame period, video data of one frame is properly transmitted through any one communication path unless a communication failure occurs in all the communication paths, and thus a video is unlikely to be interrupted. In addition, the effects described in the first embodiment can be obtained.

The exemplary embodiments of the present invention have been described in detail with reference to the appended drawings, but a concrete configuration is not limited to the above embodiments, and a design change or the like can be made within the scope not departing from the gist of the present invention. For example, the embodiments have been described in connection with the example in which video data is configured with data of each frame, but video data may be configured with data of each field. Thus, in the above embodiments, a frame may be replaced with a field. Further, after video data of one frame is transmitted and received in a predetermined one-frame period, only a video data packet that has been neither transmitted nor received due to a communication error occurring during transmission and reception of video data in a first slot may be transmitted and received in a next slot. In other words, there may be a slot for transmitting and receiving only some video data among video data of one frame.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A wireless communication terminal, comprising:
a storage unit;

an antenna unit including a directional antenna configured to transmit or receive video data of one frame or one field in a one-frame period or a one-field period through a set communication path;
a processing unit configured to process the video data transmitted or received through the directional antenna; and
a control unit, wherein
the control unit sets the communication path as a first communication path, and causes the antenna unit to transmit or receive the video data of the one frame or the one field through the first communication path,
the control unit sets the communication path as a second communication path different from the first communication path in the same frame period or the same field period as a frame period or a field period in which the video data is transmitted or received through the first communication path, and causes the antenna unit to transmit or receive same video data as all or some of the video data transmitted or received through the first communication path, through the second communication path, and
the control unit reads the video data stored in the storage unit for being transmitted via the first wireless communication path, and the video data, that is read out from the storage unit for being transmitted via the first wireless communication path, is read out from the storage unit again for being transmitted via a second wireless communication path,
wherein both of the first communication path and the second communication path are high-speed transmission channels in which narrow-directional antennas are used, and
wherein the control unit sets the communication paths such that a directional angle of the directional antenna of the first communication path is different from a directional angle of the directional antenna of the second communication path.

2. The wireless communication terminal according to claim 1,
wherein the control unit further causes the antenna unit to transmit or receive information related to the first communication path and information related to the second communication path to or from another communication terminal serving as a video data transmission or reception counterpart.

3. The wireless communication terminal according to claim 1,
wherein the control unit further measures wireless states of a plurality of communication paths through the antenna unit at a point in time earlier than a point in time at which video data of a first frame or a first field is transmitted or received when video data of a plurality of frames or a plurality of fields is transmitted or received.

4. The wireless communication terminal according to claim 1,
wherein the control unit further measures wireless states of a plurality of communication paths through the antenna unit in the same frame period of the same field period as a frame period or a field period in which the video data is transmitted or received through the first communication path and the second communication path when video data of a plurality of frames or a plurality of fields is transmitted or received.

5. The wireless communication terminal according to claim 4,
wherein a plurality of communication paths whose wireless states are measured in a first frame period or a first field period are different from a plurality of communication paths whose wireless states are measured in a second frame period or a second field period directly after the first frame period or the first field period.

6. The wireless communication terminal according to claim 3, further comprising,
a storage unit configured to store measurement result information representing a result of measuring the wireless states of the plurality of communication paths.

7. The wireless communication terminal according to claim 6,
wherein the control unit selects and sets the first communication path and the second communication path based on the measurement result information.

8. The wireless communication terminal according to claim 7,
wherein the control unit lowers a priority of a communication path in which an amount of communication errors incurred when the video data is transmitted or received within the one-frame period or the one-field period exceeds a predetermined threshold value, the priority being set in a next one-frame period or a next one-field period.

9. The wireless communication terminal according to claim 4, further comprising,
a storage unit configured to store measurement result information representing a result of measuring the wireless states of the plurality of communication paths.

10. The wireless communication terminal according to claim 9,
wherein the control unit selects and sets the first communication path and the second communication path based on the measurement result information.

11. The wireless communication terminal according to claim 10,
wherein the control unit lowers a priority of a communication path in which an amount of communication errors incurred when the video data is transmitted or received within the one-frame period or the one-field period exceeds a predetermined threshold value, the priority being set in a next one-frame period or a next one-field period.

12. The wireless communication terminal according to claim 1,
wherein the control unit complements data that is insufficient in the video data received through the first communication path and the video data received through the second communication path, and generates the video data of the one frame or the one field.

13. A wireless communication system, comprising:
a first wireless communication terminal; and
a second wireless communication terminal,
wherein the first wireless communication terminal includes
a storage unit,
a first antenna unit including a first directional antenna configured to transmit video data of one frame or one field in a one-frame period or a one-field period through a set communication path,
a processing unit configured to process the video data transmitted through the first directional antenna, and
a first control unit, wherein
the first control unit sets the communication path as a first communication path, and causes the first antenna unit to transmit the video data of the one frame or the one field through the first communication path, the first control unit sets the communication path as a second communication path different from the first communication path in the same frame period or the same field period as a frame period or a field period in which the video data is transmitted through the first communication path, and causes the first antenna unit to transmit same video data as all or some of the video data transmitted through the first communication path through the second communication path, and the first control unit reads the video data stored in the storage unit for being transmitted via the first wireless communication path, and the video data, that is read out from the storage unit for being transmitted via the first wireless communication path, is read out from the storage unit again for being transmitted via a second wireless communication path, and the second wireless communication terminal includes a second antenna unit including a second directional antenna configured to receive video data of the one frame or the one field in the one-frame period or the one-field period through a set communication path, a second processing unit configured to process the video data received through the second directional antenna, and a second control unit, wherein the second control unit sets the communication path as the first communication path, and causes the second antenna unit to receive the video data of the one frame or the one field through the first communication path, and the second control unit sets the communication path as the second communication path in the same frame period or the same field period as a frame period or field period in which the video data is received through the first communication path, and causes the second antenna unit to receive same video data as all or some of the video data received through the first communication path through the second communication path, wherein both of the first communication path and the second communication path are high-speed transmission channels in which narrow-directional antennas are used, and wherein the control unit sets the communication paths such that a directional angle of the directional antenna of the first communication path is different from a directional angle of the directional antenna of the second communication path.

14. A non-transitory computer readable medium storing a program that causes a computer of a wireless communication terminal, which includes a wireless communication terminal including an antenna unit including a directional antenna configured to transmit or receive video data of one frame or one field in a one-frame period or a one-field period through a set communication path and a processing unit configured to process the video data transmitted or received through the directional antenna, to execute:

a first step of setting the communication path as a first communication path;

a second step of causing the antenna unit to transmit or receive the video data of the one frame or the one field through the first communication path;

a third step of setting the communication path as a second communication path different from the first communication path in the same frame period or the same field period as a frame period or a field period in which the video data is transmitted or received through the first communication path;

a fourth step of causing the antenna unit to transmit or receive same video data as all or some of the video data transmitted or received through the first communication path through the second communication path, and a fifth step of reading the video data stored in a storage unit for being transmitted via the first wireless communication path, and the video data, that is read out from the storage unit for being transmitted via the first wireless communication path, is read out from the storage unit again for being transmitted via a second wireless communication path, wherein both of the first communication path and the second communication path are high-speed transmission channels in which narrow-directional antennas are used, and wherein the control unit sets the communication paths such that a directional angle of the directional antenna of the first communication path is different from a directional angle of the directional antenna of the second communication path.

* * * * *